US012770458B2

(12) United States Patent
Otomo

(10) Patent No.: US 12,770,458 B2
(45) Date of Patent: Oct. 20, 2026

(54) RECORDING MEDIUM AND INFORMATION PROCESSING DEVICE

(71) Applicant: SEGA CORPORATION, Tokyo (JP)

(72) Inventor: Takahiro Otomo, Tokyo (JP)

(73) Assignee: SEGA CORPORATION, Tokyo (JP)

( * ) Notice: Subject to any disclaimer, the term of this patent is extended or adjusted under 35 U.S.C. 154(b) by 269 days.

(21) Appl. No.: 18/597,117

(22) Filed: Mar. 6, 2024

(65) Prior Publication Data

US 2024/0212440 A1 Jun. 27, 2024

Related U.S. Application Data

(63) Continuation of application No. PCT/JP2022/032175, filed on Aug. 26, 2022.

(30) Foreign Application Priority Data

Sep. 7, 2021 (JP) ................................ 2021-145231

(51) Int. Cl.
*G07F 17/32* (2006.01)

(52) U.S. Cl.
CPC ........ *G07F 17/323* (2013.01); *G07F 17/3211* (2013.01); *G07F 17/3267* (2013.01); *G07F 17/3269* (2013.01)

(58) Field of Classification Search
None
See application file for complete search history.

(56) References Cited

U.S. PATENT DOCUMENTS

2022/0414712 A1* 12/2022 Choi ...................... G06Q 30/02
2024/0202767 A1* 6/2024 Otomo ............... G06Q 30/0213
2024/0212440 A1* 6/2024 Otomo ................ G07F 17/3267
2024/0335756 A1* 10/2024 Otomo .................... A63F 13/70
2025/0295995 A1* 9/2025 Otomo .................... A63F 13/53

FOREIGN PATENT DOCUMENTS

JP 6168230 B1 7/2017
JP 2020-103399 A 7/2020

OTHER PUBLICATIONS

International Search Report issued in corresponding International Application No. PCT/JP2022/032175 mailed Nov. 8, 2022 (5 pages).
Written Opinion issued in corresponding International Application No. PCT/JP2022/032175 mailed Nov. 8, 2022 (4 pages).

* cited by examiner

*Primary Examiner* — Ronald Laneau
(74) *Attorney, Agent, or Firm* — Osha Bergman Watanabe & Burton LLP

(57) ABSTRACT

A non-transitory computer readable recording medium stores instructions that cause a computer to execute: displaying a benefit provision period change screen that receives a change request from a user; in response to the change request, updating the benefit provision period after a start of the benefit provision period; registering a benefit that can be used in a game and is provided at a specific interval included in a remaining benefit provision period depending on the updated benefit provision period; and upon determining that a specific condition is satisfied, providing the user with the registered benefit at the specific interval included in the remaining benefit provision period.

11 Claims, 17 Drawing Sheets

RECORDING MEDIUM AND INFORMATION PROCESSING DEVICE

BACKGROUND

Technical Field

The present invention relates to a recording medium storing instructions and an information processing device.

Description of Related Art

There are conventional games that provide benefits during a predetermined benefit provision period (such as one month) to a user who has become a paid member who pays a certain fee (such as a monthly fee).

In this regard, Patent Literature 1 discloses a technique for providing benefits during a benefit provision period (a certain period) to a user (player) who has paid a certain fee.

PATENT LITERATURE

Patent Literature 1: Japanese Patent No. 6168230

TECHNOLOGICAL PROBLEM TO BE SOLVED BY THE INVENTION

With a gaming technology such as this, there are times when a predetermined benefit (such as a daily benefit) is provided at specific intervals (such as one day) included in the benefit provision period. Here, after the start of the benefit provision period, there may be a period during which the user is unable to acquire the benefit for one reason or another, and the user sometimes could not acquire the benefit that was supposed to have been acquired, which is a known problem with conventional gaming technology.

SUMMARY

One or more embodiments of the present invention provide a technological improvement over such conventional gaming technologies discussed above. In particular, one or more embodiments of the present invention provide an information processing device and a recording medium storing instructions that provide graphics improvement by displaying a benefit provision period change screen to enable a user to flexibly update a benefit provision period including a specific interval at which a benefit is provided to the user, and providing the user with the benefit depending on the updating. This improves operability of the display and gives a feeling of satisfaction to the user who acquires the benefit.

According to a first mode of the present invention, a non-transitory computer readable recording medium stores instructions that cause a computer to execute: displaying a benefit provision period change screen that receives a change request from a user; in response to the change request, updating the benefit provision period after a start of the benefit provision period; registering a benefit that can be used in a game and is provided at a specific interval included in a remaining benefit provision period depending on the updated benefit provision period; and upon determining that a specific condition is satisfied, providing the user with the registered benefit at the specific interval included in the remaining benefit provision period.

Also, with a second mode of the present invention, the specific condition is that the user has paid a certain fee.

Also, with a third mode of the present invention, the specific condition is that the user carries out a mission within the game.

Also, with a fourth mode of the present invention, as the benefit provision period has been shortened, the benefit provided at the specific interval is made more advantageous.

Also, with a fifth mode of the present invention, a number of benefits provided at the specific interval is increased in inverse proportion to a length of the benefit provision period.

Also, with a sixth mode of the present invention, a type of benefit provided at the specific interval is upgraded in inverse proportion to a length of the benefit provision period.

Also, with a seventh mode of the present invention, the benefit is provided to the user in response to a request to acquire the benefit has been received from the user after logging into the game.

Also, with an eighth mode of the present invention, once the benefit provision period has been extended, a total number of benefits to be provided in the remaining benefit provision period is increased.

Also, according to a ninth mode of the present invention, an information processing device comprises: a display that displays a benefit provision period change screen that receives a change request from a user; and a control device that: in response to the change request, updates the benefit provision period after a start of the benefit provision period; registers a benefit that can be used in a game and is provided at a specific interval included in a remaining benefit provision period depending on the updated benefit provision period; and upon determining that a specific condition is satisfied, provides the user with the registered benefit at the specific interval included in the remaining benefit provision period.

One or more embodiments of the present invention provide an information processing device and a recording medium storing instructions that provide graphics improvement by displaying a benefit provision period change screen to enable a user to flexibly update a benefit provision period including a specific interval at which a benefit is provided to the user, and providing the user with the benefit depending on the updating.

DETAILED DESCRIPTION

Figure 1:
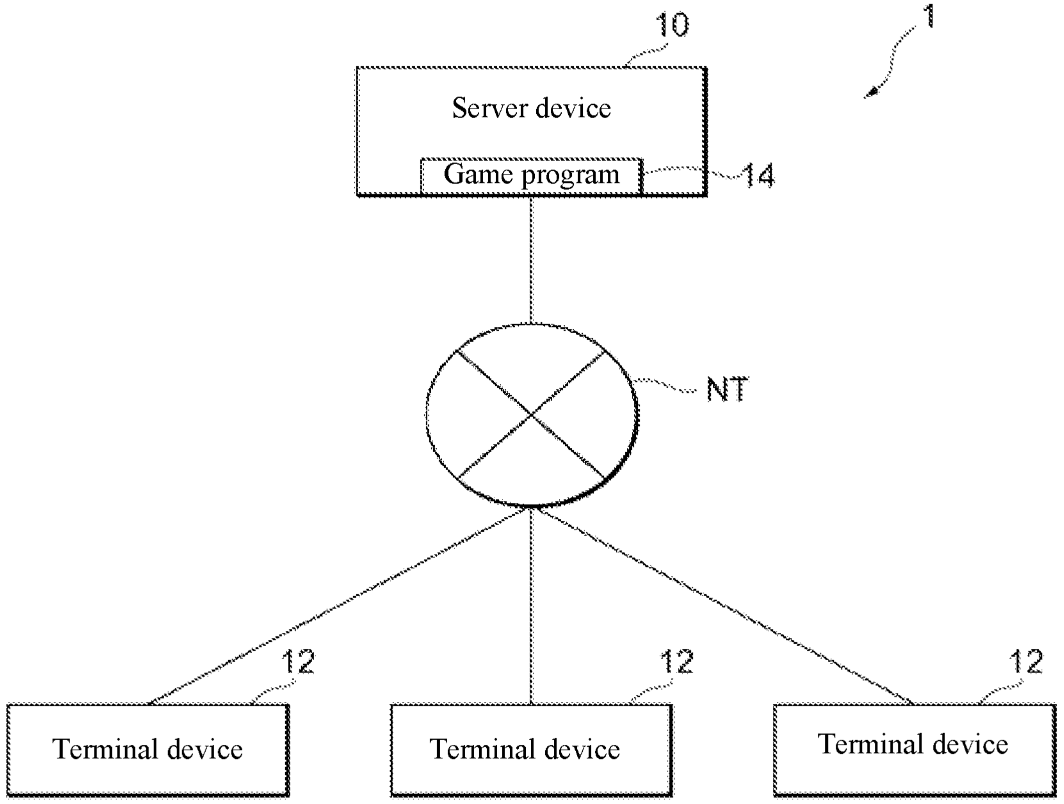
FIG. 1 is a block diagram showing an example of the overall configuration of a game system according to a first embodiment.

A number of embodiments of the present invention will be described below with reference to the appended drawings. To facilitate understanding of the description, components and steps that are the same will be numbered the same as much as possible in the drawings, and redundant description will be omitted.

First Embodiment

A first embodiment will be described now.

Overall Configuration

FIG. 1 is a block diagram showing an example of the overall configuration of a game system 1 according to the first embodiment.

As shown in FIG. 1, a game system 1 comprises a server device 10 and one or more terminal devices 12. The server device 10 and terminal devices 12 are connected so as to be able to communicate via a communication network NT such as an intranet, the Internet, or a telephone line.

The server device 10 is an information processing device that provides the execution results of the game obtained by executing instructions such as a game program 14, or the instructions themselves, to the user of each terminal device 12 via the communication network NT. In the first embodiment, the server device 10 provides the instructions themselves to the users of the terminal devices 12.

Each terminal device 12 is an information processing device belonging to a user, and is an information processing device that provides a game to a player by executing the game program 14 received from the server device 10 after the instructions have been installed. Examples of these terminal devices 12 include video game machines, arcade game machines, mobile phones, smartphones, tablets, personal computers, and various other such devices.

Hardware Configuration

Figure 2:
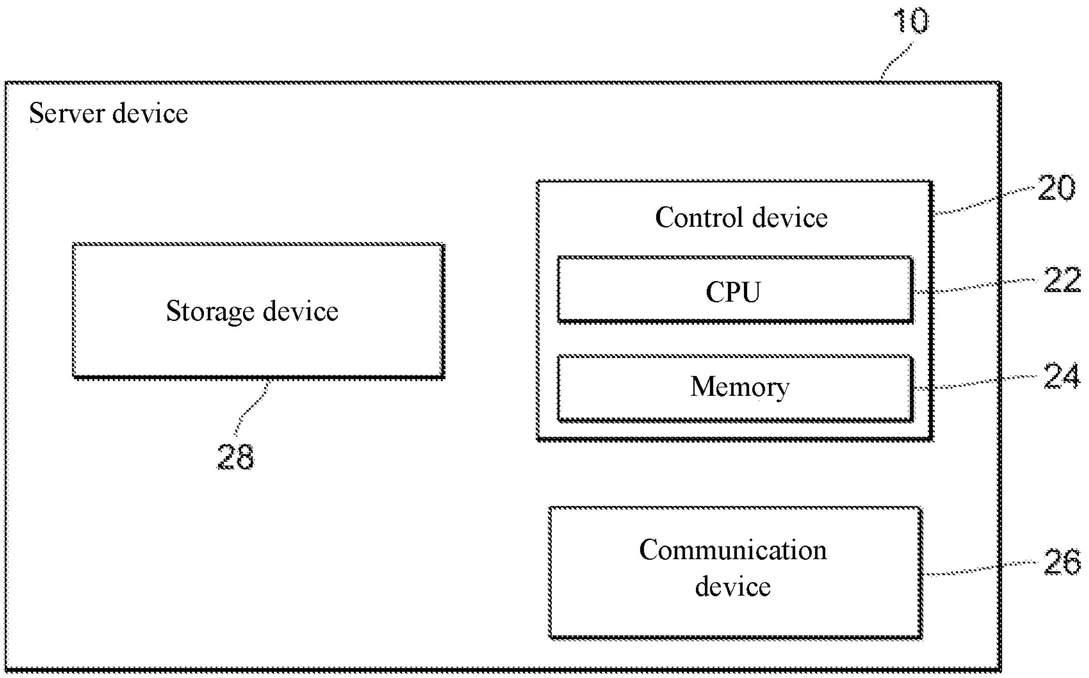
FIG. 2 is a diagram schematically showing an example of the hardware configuration of a server device.

FIG. 2 is a diagram schematically showing an example of the hardware configuration of the server device 10.

As shown in FIG. 2, the server device 10 comprises a control device 20, a communication device 26, and a storage device 28. The control device 20 mainly comprises a CPU (central processing unit) 22 and a memory 24.

In the control device 20, the CPU 22 functions as various functional units by executing specific instructions stored in the memory 24, the storage device 28, or the like. These functional units will be described in detail below.

The communication device 26 is constituted by a communication interface or the like for communicating with an external device. The communication device 26 sends and receives various kinds of information to and from the terminal device 12, for example.

The storage device 28 is constituted by a hard disk or the like. The storage device 28 stores various kinds of instructions and various kinds of information necessary for executing processing in the control device 20, including the game program 14, as well as information about processing results.

The server device 10 can be realized by using an information processing device such as a dedicated or general-purpose server computer. Also, the server device 10 may be constituted by a single information processing device, or may be constituted by a plurality of information processing devices distributed on the communication network NT. Also, FIG. 2 shows only a part of the main hardware configuration of the server device 10, and the server device 10 can comprise other components that are ordinarily provided to a server. Also, the hardware configuration of the plurality of terminal devices 12 may have the same configuration as the server device 10, except for comprising an operating device, a display device, and a sound output device, for example.

Figure 3:
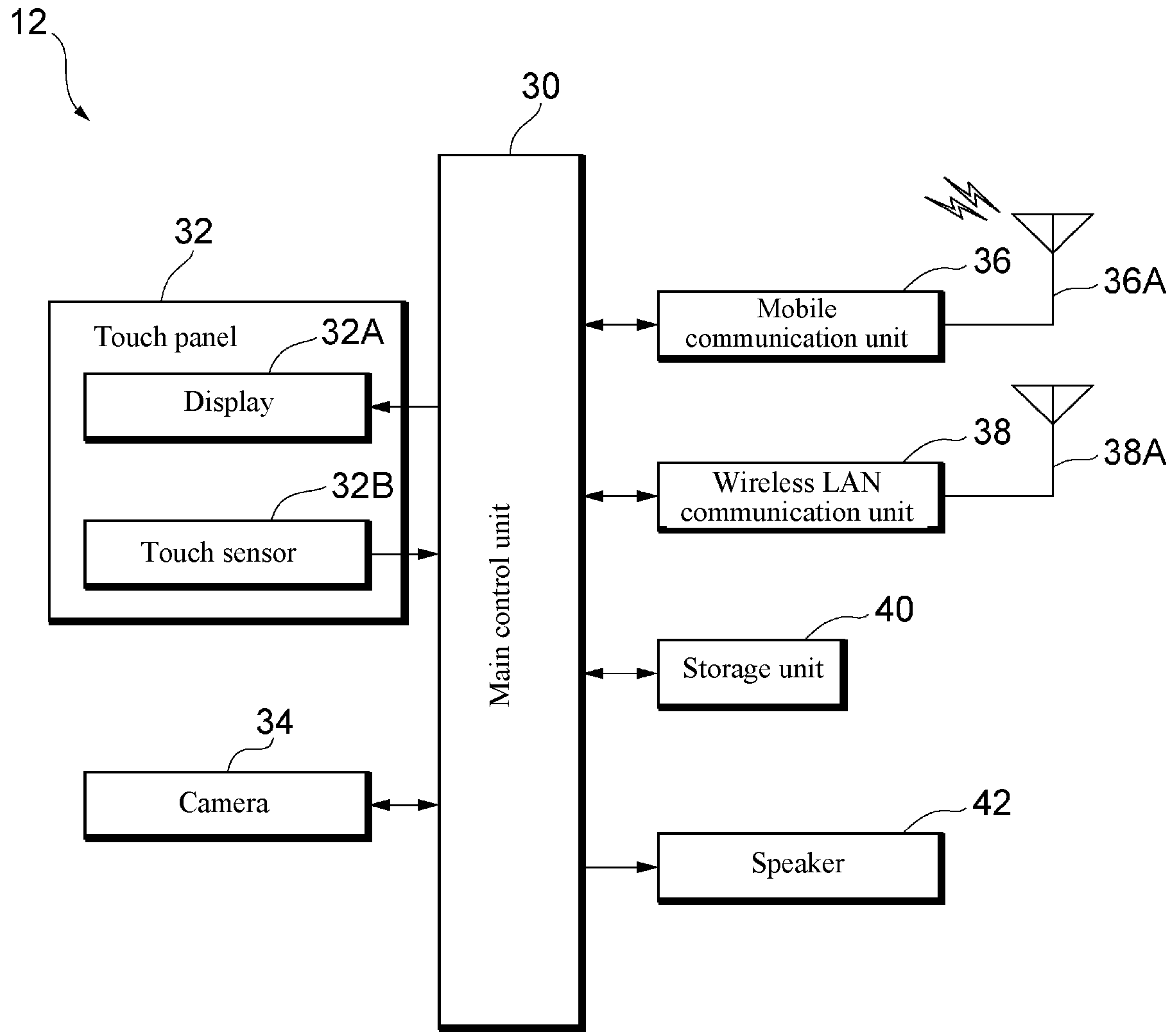
FIG. 3 is a diagram showing an example of the hardware configuration of a smart phone, as the terminal device shown in FIG. 1.

FIG. 3 is a diagram showing an example of the hardware configuration of a smartphone serving as the terminal device 12 shown in FIG. 1.

As shown in FIG. 3, the terminal device 12 comprises a main control unit (controller) 30, a touch panel (touch screen) 32, a camera 34, a mobile communication unit (mobile communication interface) 36, a wireless LAN communication unit (wireless LAN communication interface) 38, a storage unit (storage) 40, and a speaker 42.

The main control unit 30 includes a CPU, a memory, and the like. This main control unit 30 is connected to the touch panel 32 (used as a display input device), the camera 34, the mobile communication unit 36, the wireless LAN communication unit 38, the storage unit 40, and the speaker 42. The main control unit 30 has the function of controlling these connected devices.

The touch panel 32 has both a display function and an input function, and is constituted by a display 32A that handles the display function, and a touch sensor 32B that handles the input function. In the first embodiment, the display 32A can display game images including button images, a cross key image, a joystick image, and other such operation input images. The touch sensor 32B can sense the input position of the user with respect to a game image.

The camera 34 has the function of capturing still and/or moving images and storing these images in the storage unit 40.

The mobile communication unit 36 is connected to a mobile communication network via an antenna 36A, and has the function of communicating with other communication devices that are connected to this mobile communication network.

The wireless LAN communication unit 38 is connected to the communication network NT via an antenna 38A, and has the function of communicating with other devices, such as the server device 10, that are connected to the communication network NT.

The storage unit 40 stores various kinds of instructions and data, such as the game program 14, and play data indicating user information or the progress of the game in the instructions. This play data may be stored in the server device 10.

The speaker 42 has the function of outputting game sounds and so forth.

Game Overview

The game according to the first embodiment includes lottery games, quests, and so on, which are game types in which a user can acquire characters (an example of content). These lottery games are sometimes referred to as gacha (loot box), raffle, summoning, or the like. These quests are sometimes referred to as battle games, dungeons, searches, or the like.

A lottery game according to the first embodiment is a game in which a user is able to earn one or more randomly selected characters from the lottery target character group, in accordance with an instruction (request) from the user to execute a lottery game. This lottery is executed on the basis of the consumption of currency items, gacha tickets, etc., possessed by the user. Examples of currency items include charged items (such as paid stones) and non-charged items (such as free stones). A charged item is a paid item granted to the user on the basis of a payment made with money, a prepaid card, a credit card, crypto assets, or the like. Also, a non-charged item is a free item given to the user in the game. A non-charged item has the same value as, for example, a charged item. With the lottery game according to the first embodiment, the lottery game cannot be executed with non-charged items, and may only be executed with charged items.

Also, a quest according to the first embodiment is a game in which a team composed of one or more characters possessed by a user and enemy characters play against each other on the basis of an instruction (request) from the user to execute the quest.

For example, in an organization menu for organizing characters to be used in the quest, the user can organize characters to be used in the quest by arbitrarily selecting one or more characters from his or her possessed characters.

These quests are executed on the basis of the consumption of the current stamina associated with the user. When the user clears the quest, that is, when the hit points of an enemy character (boss character) that appears at the end fall to zero or less, the user can acquire a clearance reward. Examples of this clearance reward include non-charged items (free stones), gacha tickets, coins, characters, training items, user experience points, and so forth. An example of a training item is an item for increasing the character experience value of a character. On the other hand, if the user is unable to clear the quest, he or she can choose whether to continue the quest by consuming non-charged items (free stones) or continuation items, or to give up on clearing the quest.

Also, with the game according to the first embodiment, when the user satisfies a specific condition, the user is provided with a benefit (preferential treatment) that can be used in the game, at specific intervals included in the benefit provision period. This benefit provision period may be, for example, a period of five days starting from the day when the user satisfies the specific condition.

Examples of this specific condition include that the user has paid a certain fee, or that the user has carried out a mission in the game. This certain fee may be, for example, a price that matches a benefit package. Examples of the payment of this certain fee include payment using money, a prepaid card, a credit card, crypto assets, or the like, or payment involving the consumption of charged items or non-charged items. Examples of carrying out a mission include when a parameter (such as luck, skill level, etc.) reaches a specific value (such as 99) for a specific number of characters, when all specified quests are cleared, when the number of consecutive login days or the cumulative number of login days reaches a specific number (such as 10 days), when one or more questionnaires have been answered, when one or more advertisement videos have been viewed, when the total amount of stamina consumption reaches a specific value (such as 200), and so forth.

Examples of a specific interval period may include 6 hours, 12 hours, one day, or one week. For example, a user who has received a benefit within a specific interval period (such as one day) is unable to receive the next benefit until the specific interval period has elapsed (until the next day, for instance). More specifically, a user who has received a benefit on the third day of a benefit provision period (of five days, for instance) is unable to receive the next benefit until the next day (the fourth day).

Examples of benefits (preferential treatment) include content that can be used in the game, such as charged items, non-charged items, gacha tickets, training items, stamina restoration items, continuation items, characters, and so forth. For example, a user who has paid a certain fee can obtain (acquire) a benefit by logging into the game at each specific interval and then requesting the benefit.

Functional Units

Figure 4:
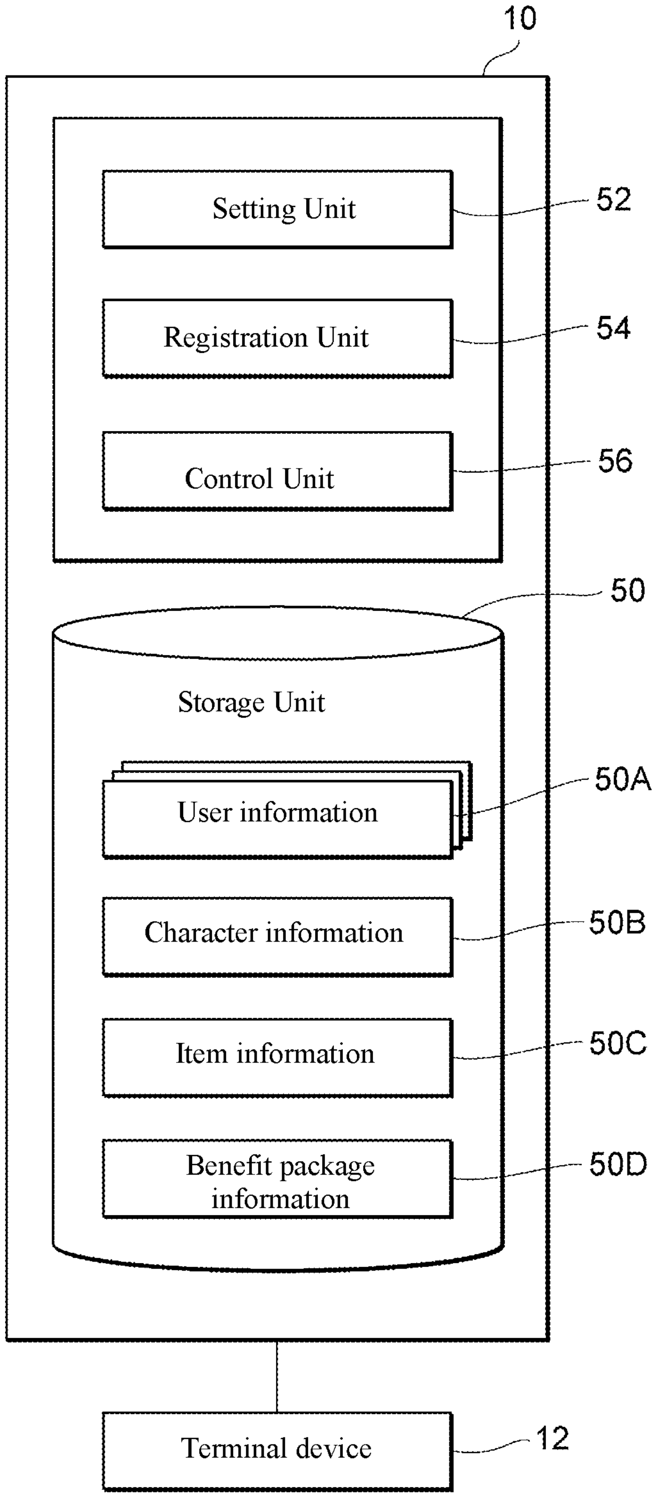
FIG. 4 is a block diagram showing an example of the functional configuration of a server device.

FIG. 4 is a block diagram showing an example of the functional configuration of the server device 10.

As shown in FIG. 4, the server device 10 comprises, as functional components, a storage unit 50, a setting unit 52, a registration unit 54, and a control unit 56. The storage unit 50 is realized in the form of one or more storage devices 28. Functional units other than the storage unit 50 are realized when the control device 20 executes the instructions stored in the storage device 28 or the like.

The storage unit 50 is a functional unit that stores user information 50A, character information 50B, item information 50C, benefit package information 50D, etc.

User information 50A is stored for each user in association with the user ID of that user. This user information 50A includes, for example, the user's name and age, user rank, possessed character information, possessed item information, stamina information, and benefit provision information.

The user rank increases, for example, when the user acquires user experience points by playing a game (such as a quest). Possessed character information includes the character ID and ability parameters of each character possessed by the user (possessed characters).

Ability parameters are, for example, a character's level, hit points, attack power, defense power, and the like. The level increases when character experience points are acquired by fusing training items with a character. As a character's level increases, its hit points, attack power, defense power, and so forth also increase.

Possessed item information includes the item ID and number of each item possessed by the user. Examples of these items include charged items, non-charged items, training items, stamina restoration items, continuation items, gacha tickets, coins, and so forth.

Stamina information includes the current stamina value or the stamina upper limit value. The current stamina value is the value consumed when each type of quest is executed. This current stamina value increases by a specific amount (such as 1) after a certain period of time (such as 3 minutes) elapses, and recovers to the stamina upper limit value. Also, this current stamina value is restored to exceed the stamina upper limit value when the user consumes charged items, non-charged items, stamina restoration items, or the like. This stamina upper limit value increases along with the user's user rank.

Benefit provision information is stored for each benefit package in association with the benefit package ID of the benefit package. This benefit provision information includes qualification flags, benefit provision periods, benefit types, number of provisions, total number of provisions, number of times provided, and history of benefit provision. The qualification flag includes a value (1 or 0) indicating whether the user has satisfied a specific condition. For example, the qualification flag includes a value indicating whether the user has paid a certain fee, or a value indicating whether the user has cleared a mission. This value is 1 if the specific condition is satisfied, and 0 if the specific condition is not satisfied, for example. This qualification flag is initialized (reset) to 0 at the end date and time of the set benefit provision period, or when the number of times provided (total number of provisions) is 0, for example. The benefit provision period includes the period during which the benefit is provided (such as the start date and time and the end date and time). In the first embodiment, the benefit provision period is set by the user. The benefit type includes, for example, a character ID or an item ID as the type of benefit (content) to be provided to the user at subsequent specific intervals. The number of provisions includes the number of benefits (sets of content) to be provided to the user at subsequent specific intervals. The total number of provisions includes the total number of benefits (sets of content) to be provided to the user over the course of the subsequent (remaining) benefit provision period. For example, when the user acquires a benefit (content), the registration unit 54 reduces the total number of provisions by the number of benefits acquired by the user. The number of times provided includes the number of times that a benefit (content) can be provided to the user over the course of the subsequent (remaining) benefit provision period. This number of times provided is decremented (−1) when the user has acquired a benefit (content), or when a specific interval period has elapsed without the user acquiring a benefit. For example, the number of provisions is the total number of provisions divided by the number of times provided (total number of provisions÷number of times provided). The benefit provision history includes the date and time when the user acquired the benefit (content) during the benefit provision period.

Character information 50B is stored for each character in association with the character ID of that character. This character information 50B includes, for example, the character name or image (design), rarity, initial values (such as hit points, attack power, defense power, etc., at level 1) and upper limit values (such as hit points, attack power, defense power, etc., at level 100) of ability parameters, and skills.

Rarity may be represented by a number from 1 to 6, for example. This number may be indicated by a number of stars, for example. Here, characters with high rarity are set to have ability parameters and skills that are advantageous for the game (such as in quests).

Item information 50C is stored for each item in association with the item ID of that item. This item information 50C includes, for example, the name, image (design), efficacy, etc., of the item. Examples of these items include charged items, non-charged items, training items, stamina restoration items, continuation items, gacha tickets, coins, and so forth. For example, the efficacy of a training item includes a character experience value that the character acquires through fusion. Also, the efficacy of a stamina restoration item includes the restoration amount for restoring the current stamina value, for example.

Benefit package information 50D is stored for each benefit package in association with the benefit package ID of that benefit package. This benefit package information 50D includes, for example, the name of the benefit package, the benefit availability period, benefit provision conditions, and benefit information.

The benefit availability period includes the period during which benefits can be provided. Examples of the benefit availability period include one to five days, two to nine days, and one week to one month.

The benefit provision conditions include conditions for providing a benefit package to the user. For example, the benefit provision conditions include that the purchase price (a certain fee) of a benefit package has been paid, that a specific mission has been carried out, or the like. For example, the benefit provision conditions for one benefit package may include that a purchase price of 500 yen has been paid. Also, the benefit provision conditions for another benefit package may include that two advertising videos have been viewed for a specific mission.

Benefit information includes, for each benefit provision period that can be set in the benefit availability period, the type of benefit, the number of provisions, the total number of provisions, and the number of times provided. The benefit type includes, for example, the character ID or item ID as the type of benefit (content) provided at each specific interval. The number of provisions includes the number of benefits (sets of content) provided at each specific interval. The total number of provisions includes the total number of benefits (sets of content) provided over the course of the benefit provision period. The number of times provided includes the number of times a benefit (content) can be provided during the benefit provision period. For example, the number of provisions is the total number of provisions divided by the number of times provided (total number of provisions÷number of times provided). With this benefit information, the number of benefits provided at each specific interval increases, or the type of benefit provided at each specific interval is upgraded in inverse proportion to the length of the benefit provision period.

For example, if the benefit provision period is one day, the benefit information for one benefit package may include the benefit type being the item ID of a non-charged item, the number of provisions being 1000, the total number of provisions being 1000, and the number of times provided being one time. Also, for example, if the benefit provision period is two days, the benefit information for one benefit package may include the benefit type being the item ID of a non-charged item, the number of provisions being 550, the total number of provisions being 1100, and the number of times provided being two times. Also, for example, if the benefit provision period is three days, the benefit information for one benefit package may include the benefit type being the item ID of a non-charged item, the number of provisions being 400, the total number of provisions being 1200, and the number of times provided being three times. Also, for example, if the benefit provision period is four days, the benefit information for one benefit package may include the benefit type being the item ID of a non-charged item, the number of provisions being 325, the total number of provisions being 1300, and the number of times provided being four times. Also, for example, if the benefit provision period is five days, the benefit information for one benefit package may include the benefit type being the item ID of a non-charged item, the number of provisions being 280, the total number of provisions being 1400, and the number of times provided being five times.

Also, for example, if the benefit provision period is one day, the benefit information for another benefit package may include the benefit type being the item ID of a stamina restoration item that fully restores stamina, the number of provisions being 10, the total number of provisions being 10, and the number of times provided being one time. Also, for example, if the benefit provision period is two days, the benefit information for another benefit package may include the benefit type being the item ID of a stamina restoration item that restores stamina 100 times, the number of provisions being 10, the total number of provisions being 20, and the number of times provided being two times. Also, for example, if the benefit provision period is three days, the benefit information for another benefit package may include the benefit type being the item ID of a stamina restoration item that restores stamina 75 times, the number of provisions being 10, the total number of provisions being 30, and the number of times provided being three times. Also, for example, if the benefit provision period is four days, the benefit information for another benefit package may include the benefit type being the item ID of a stamina restoration item that restores stamina 60 times, the number of provisions being 10, the total number of provisions being 40, and the number of times provided being four times. Also, for example, if the benefit provision period is five days, the benefit information for another benefit package may include the benefit type being the item ID of a stamina restoration item that restores stamina 50 times, the number of provisions being 10, the total number of provisions being 50, and the number of times provided being five times.

The setting unit 52 is a functional unit for setting the benefit provision period. In the first embodiment, the setting unit 52 sets the benefit provision period in response to a setting request from the user. For example, the setting request may be made immediately after the user has paid the purchase price (a certain fee) corresponding to the benefit package. Also, for example, the setting request may be made immediately after the user has carried out a mission corresponding to the benefit package.

The registration unit 54 is a functional unit for registering the benefit provided at each specific interval period (such as one day). In the first embodiment, the registration unit 54 registers (stores) benefit provision information in the user information 50A according to the benefit provision period set by the setting unit 52. For example, the registration unit 54 refers to the benefit information in the benefit package information 50D and acquires the type of benefit (content), the number of provisions, the total number of provisions, and the number of times provided, according to the benefit provision period that has been set. The registration unit 54 then registers (stores) the acquired benefit type (content), number of provisions, total number of provisions, and number of times provided in the benefit provision information in the user information 50A.

In the first embodiment, the registration unit 54 refers to the benefit information in the benefit package information 50D, and makes the benefit provided at each specific interval more advantageous in inverse proportion to the length of the set benefit provision period. More specifically, the shorter the set benefit provision period, the more the registration unit 54 increases the number of provisions (the number of benefits provided at each specific interval) in the benefit provision information of the user information 50A, or upgrades the type of benefit (type of benefit provided at each specific interval) in the benefit provision information. This upgrade serves to raise the value of the content. Examples of an upgrade include changing a non-charged item to a charged item, raising the grade (the amount of the character experience value) of a training item, increasing the grade (restoration amount) of a stamina restoration item, changing a stamina restoration item or a continuation item to a gacha ticket, changing a character of rarity 5 to a character of rarity 6, and so forth.

Furthermore, the registration unit 54 may both increase the number of benefits provided and upgrade the type of benefit in inverse proportion to the length of the benefit provision period. Also, in the first embodiment, the registration unit 54 increases the total number of benefits provided over the course of the benefit provision period in proportion to the length of the set benefit provision period. For example, the longer the set benefit provision period, the more the registration unit 54 increases the total number of provisions (the total number of benefits over the course of the benefit provision period) in the benefit provision information of the user information 50A.

The control unit 56 is a functional unit for controlling the entire game. In the first embodiment, when the user satisfies a specific condition, the control unit 56 provides a benefit registered in the benefit provision information of the user information 50A at each specific interval included in the benefit provision period set by the setting unit 52. This specific interval period may be, for example, one day. For example, the control unit 56 provides the user with a benefit (a daily benefit) each day included in the benefit provision period (such as over a period of five days).

Also, in the first embodiment, when a request to acquire a benefit has been received from the user after logging into the game, the control unit 56 provides the user with a benefit at each specific interval. For example, when a request to acquire a benefit package that satisfies a specific condition has been received from the user after the user has started the game, the control unit 56 adds that benefit to the user's possessed character information or possessed item information. Examples of this acquisition request include an operation to acquire a benefit from a benefit package menu in the game, an operation to open a message in the game, and so forth.

Flow of Processing for Registering Benefits

Figure 5:
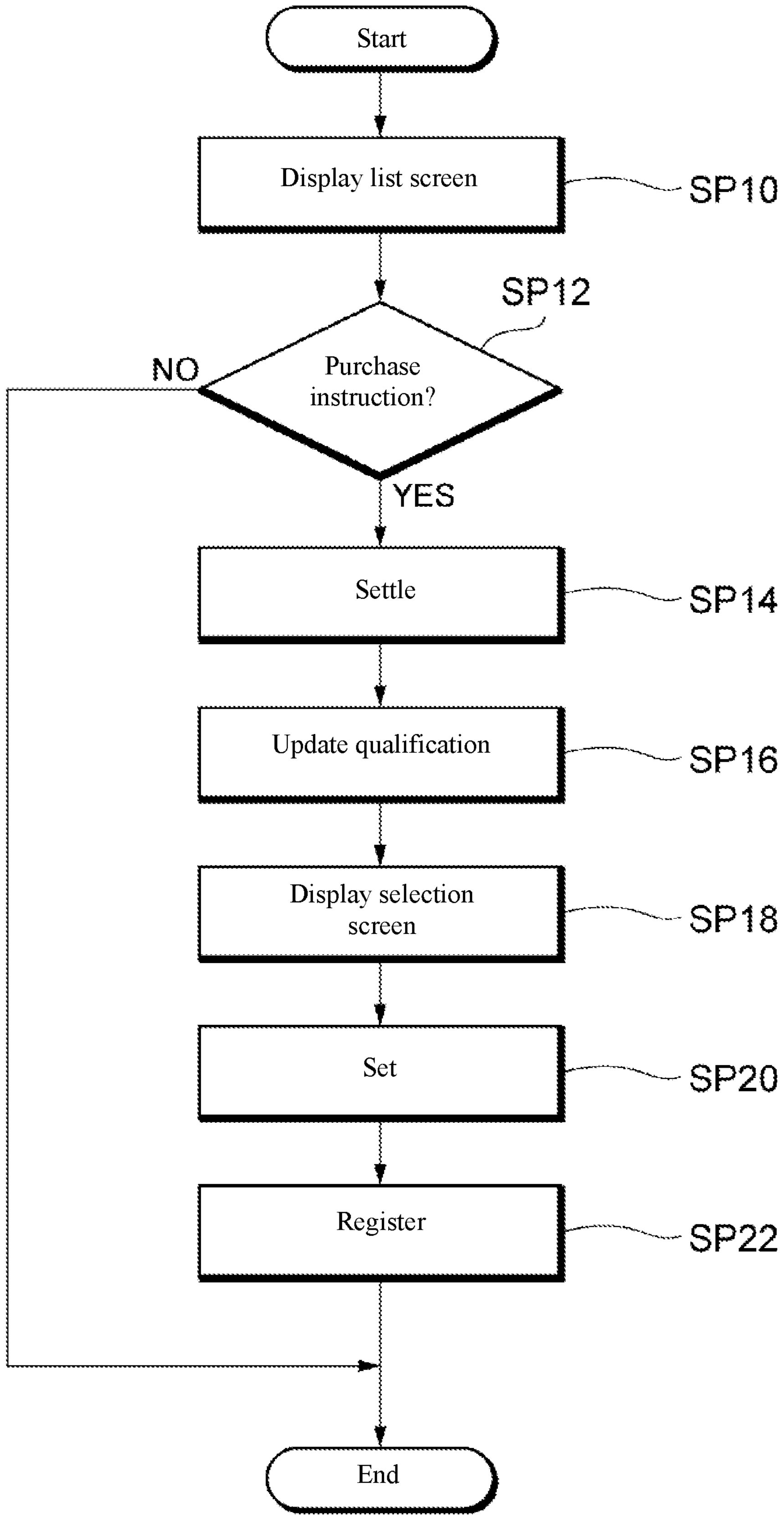
FIG. 5 is a flowchart showing an example of the flow of processing for registering benefits in the game system according to the first embodiment.

FIG. 5 is a flowchart showing an example of the flow of processing for registering benefits in the game system according to the first embodiment. Also, the processing in the following steps is started, for example, at the point when the benefit package menu is selected from the top menu, after the user has logged into the game outside the benefit provision period of each benefit package. The order and details of the following steps can be changed as needed.

Step SP10

The control unit 56 refers to the benefit provision information in the user information 50A or the benefit package information 50D, and causes the touch panel 32 of the terminal device 12 possessed by the user to display a list screen of benefit packages that are outside the benefit provision period.

Figure 6:
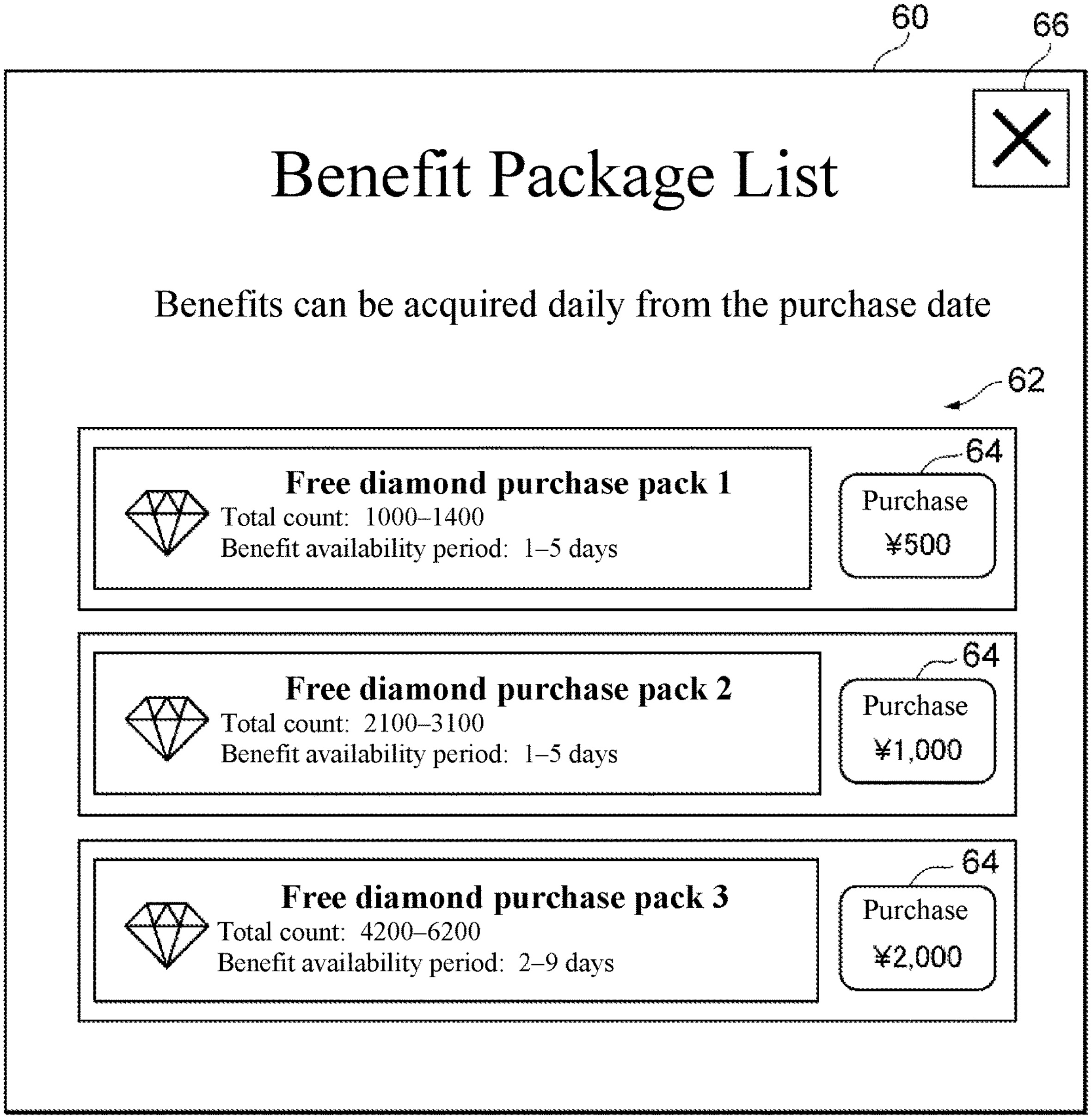
FIG. 6 is a diagram showing an example of a list screen in which the benefit packages according to the first embodiment are all outside the benefit provision period.

FIG. 6 is a diagram showing an example of a list screen 60 in which the benefit packages according to the first embodiment are all outside the benefit provision period.

As shown in FIG. 6, the list screen 60 is provided with a benefit package information area 62, a purchase button 64, and a close button 66. The benefit package information area 62 shows the name of the benefit package, the total number of benefits (sets of content) that can be acquired through purchase, the benefit availability period, and so forth. The purchase button 64 is used to purchase the corresponding benefit package. This purchase button 64 is displayed for benefit packages that the user has not purchased, that is, benefit packages whose qualification flag is 0. The close button 66 is used to close the list screen 60 and return to the top menu screen.

Going back to FIG. 5, the processing moves to the processing of step SP12.

Step SP12

The control unit 56 determines whether or not there has been a purchase instruction for a benefit package from the user. For example, the control unit 56 determines whether or not the user has pressed the purchase button corresponding to a benefit package on the list screen. Then, if the determination is positive, the processing moves to the processing of step SP14. On the other hand, if the determination is negative, the processing ends the processing series shown in FIG. 5. For example, the control unit 56 makes a negative determination if the close button has been pressed on the list screen.

Step SP14

The control unit 56 settles the purchase price (a certain fee) of the benefit package for which the user has issued a purchase instruction in step SP12. For example, the control unit 56 refers to the benefit provision conditions of the benefit package information 50D and acquires the purchase price (a certain fee) of one benefit package. The control unit 56 then settles the purchase price of the acquired benefit package using a prepaid card or credit card owned by the user. Then, the processing moves to the processing of step SP16.

Step SP16

The control unit 56 updates the qualification flag of the benefit provision information in the user information 50A. For example, the control unit 56 updates the qualification flag of the benefit provision information corresponding to one benefit package to 1. Then, the processing moves to the processing of step SP18.

Step SP18

The control unit 56 refers to the benefit package information 50D and causes the touch panel 32 of the terminal device 12 owned by the user to display a selection screen for the benefit provision period.

Figure 7A:
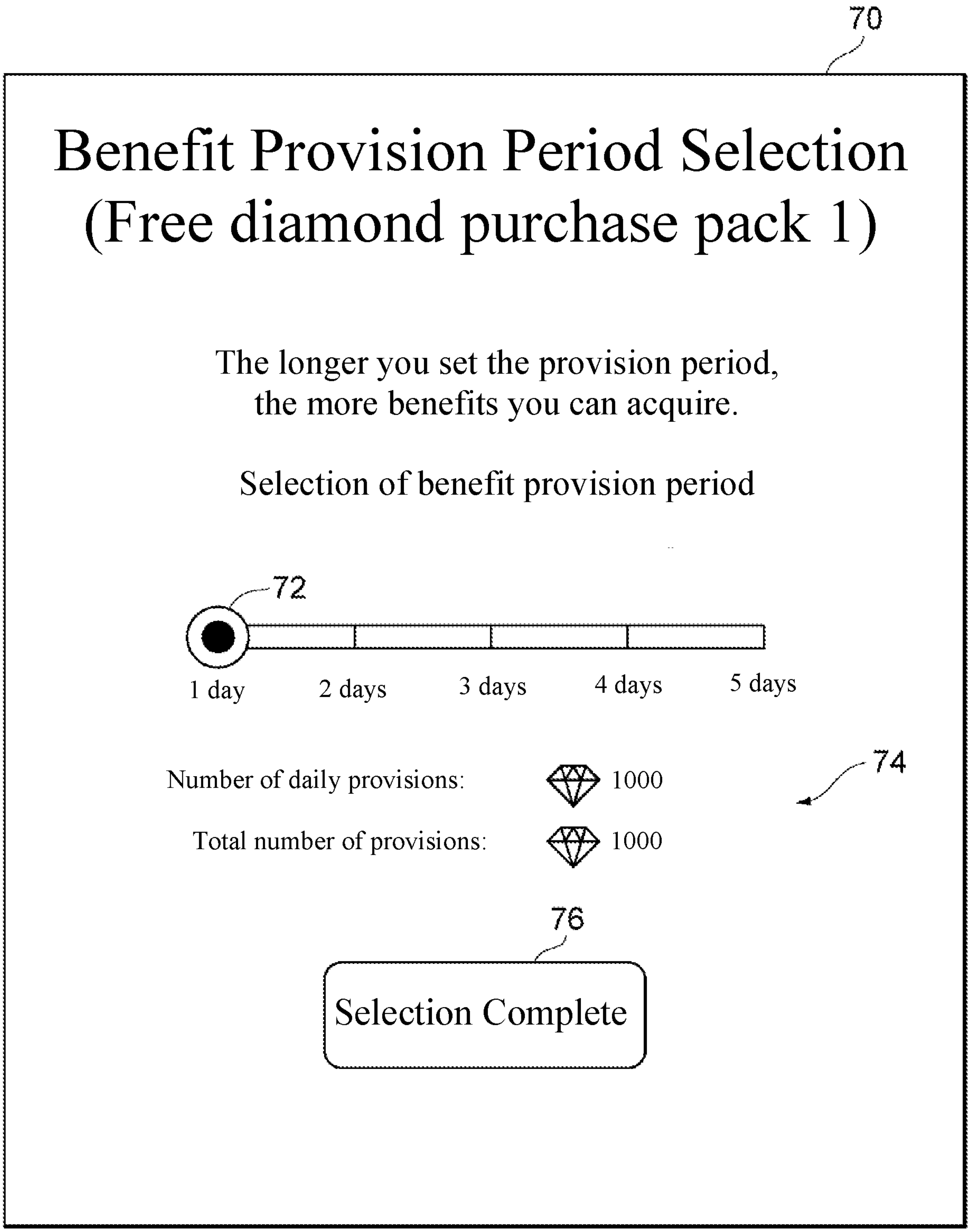
FIG. 7A is a diagram showing an example of a benefit provision period selection screen according to the first embodiment, and is a diagram showing an example of the selection screen when the benefit provision period has been set to one day by the user.
Figure 7B:
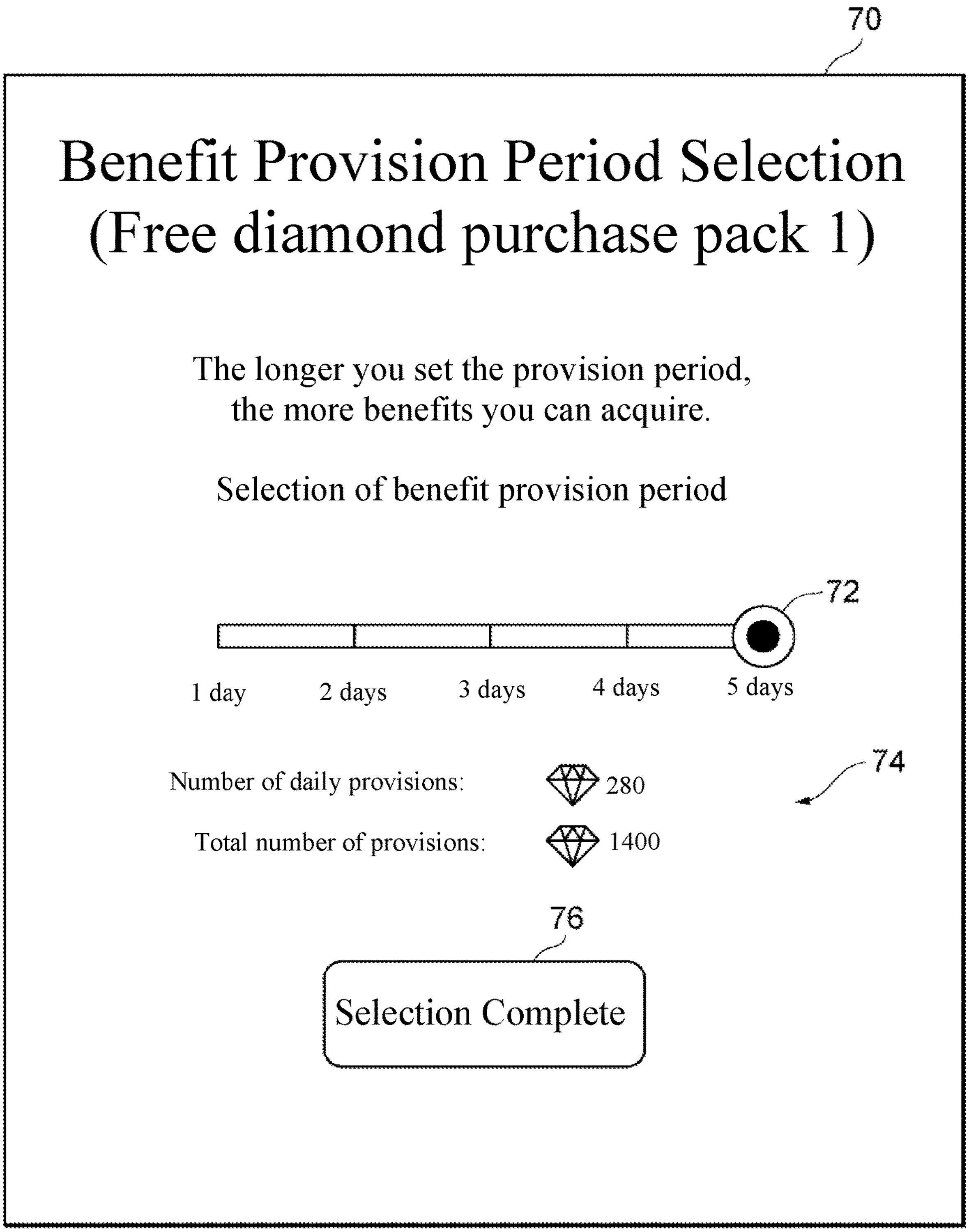
FIG. 7B is a diagram showing an example of the benefit provision period selection screen according to the first embodiment, and is a diagram showing an example of the selection screen when the benefit provision period has been set to five days by the user.

FIGS. 7A-7B are diagrams showing an example of the selection screen 70 for the benefit provision period according to the first embodiment. Here, FIG. 7A is a diagram showing an example of the selection screen 70 when the benefit provision period has been set to one day by the user. FIG. 7B is a diagram showing an example of the selection screen 70 when the benefit provision period has been set to five days by the user.

As shown in FIGS. 7A and 7B, the selection screen 70 is provided with a slide button 72, a benefit provision information area 74, and a selection completion button 76. The slide button 72 is used for receiving instructions from the user through a movement operation from the user. The slide button 72 is associated with a benefit availability period (such as one to five days) of the benefit package information 50D, and is used to select the benefit provision period of the benefit package. The slide button 72 lengthens the benefit provision period when moved to the right in response to a movement operation from the user. For example, when the user slides the slide button 72 one position to the right, the benefit provision period will be extended by one day. Similarly, the slide button 72 shortens the benefit provision period when moved to the left in response to a movement operation from the user. For example, when the user slides the slide button 72 one position to the left, the benefit provision period is shortened by one day. The benefit provision information area 74 shows the benefit and its number provided in one day (a specific interval period), and the benefit and its total number provided over the course of the benefit provision period. The benefit provision information area 74 shows, for example, that the shorter the benefit provision period is, the greater the number of benefits provided in one day. Also, the benefit provision information area 74 shows, for example, that the total number of benefits provided over the course of the benefit provision period increases in proportion to the length of the benefit provision period. The selection completion button 76 is used for completing the selection of the benefit provision period.

Going back to FIG. 5, the processing moves to the processing of step SP20.

Step SP20

The setting unit 52 receives a press of the selection completion button (setting request) from the user on the selection screen. The setting unit 52 then sets the benefit provision period of the benefit provision information in the user information 50A. For example, the setting unit 52 sets (stores) the benefit provision period selected by the user as the benefit provision period of that benefit provision information. For example, when one day has been selected with the slide button on the selection screen, the setting unit 52 stores one day in the benefit provision period. Then, the processing moves to the processing of step SP22.

Step SP22

The registration unit 54 registers the benefit to be provided to the user according to the benefit provision period set by the setting unit 52 in step SP20. For example, the registration unit 54 refers to the benefit information in the benefit package information 50D and acquires the type of benefit (content), the number of provisions, the total number of provisions, and the number of times provided, according to the set benefit provision period. The registration unit 54 then registers (stores) the acquired benefit type (content), the number of provisions, the total number of provisions, and the number of times provided in the benefit provision information in the user information 50A.

For example, the registration unit 54 makes the benefit provided at each specific interval more advantageous in inverse proportion to the length of the benefit provision period. More specifically, when the set benefit provision period is three days, the registration unit 54 registers (stores) in the benefit provision information the item ID of a non-charged item as the benefit type (content), 400 as the number of provisions, 1200 as the total number of provisions, and three times as the number of times provided. Also, if the benefit provision period has been set to one day, the registration unit 54 registers (stores) in the benefit provision information the item ID of a non-charged item as the benefit type (content), 1000 as the number of provisions, 1000 as the total number of provisions, and once as the number of times provided. Then, the processing ends the processing series shown in FIG. 5.

Flow of Processing for Providing Benefits

Figure 8:
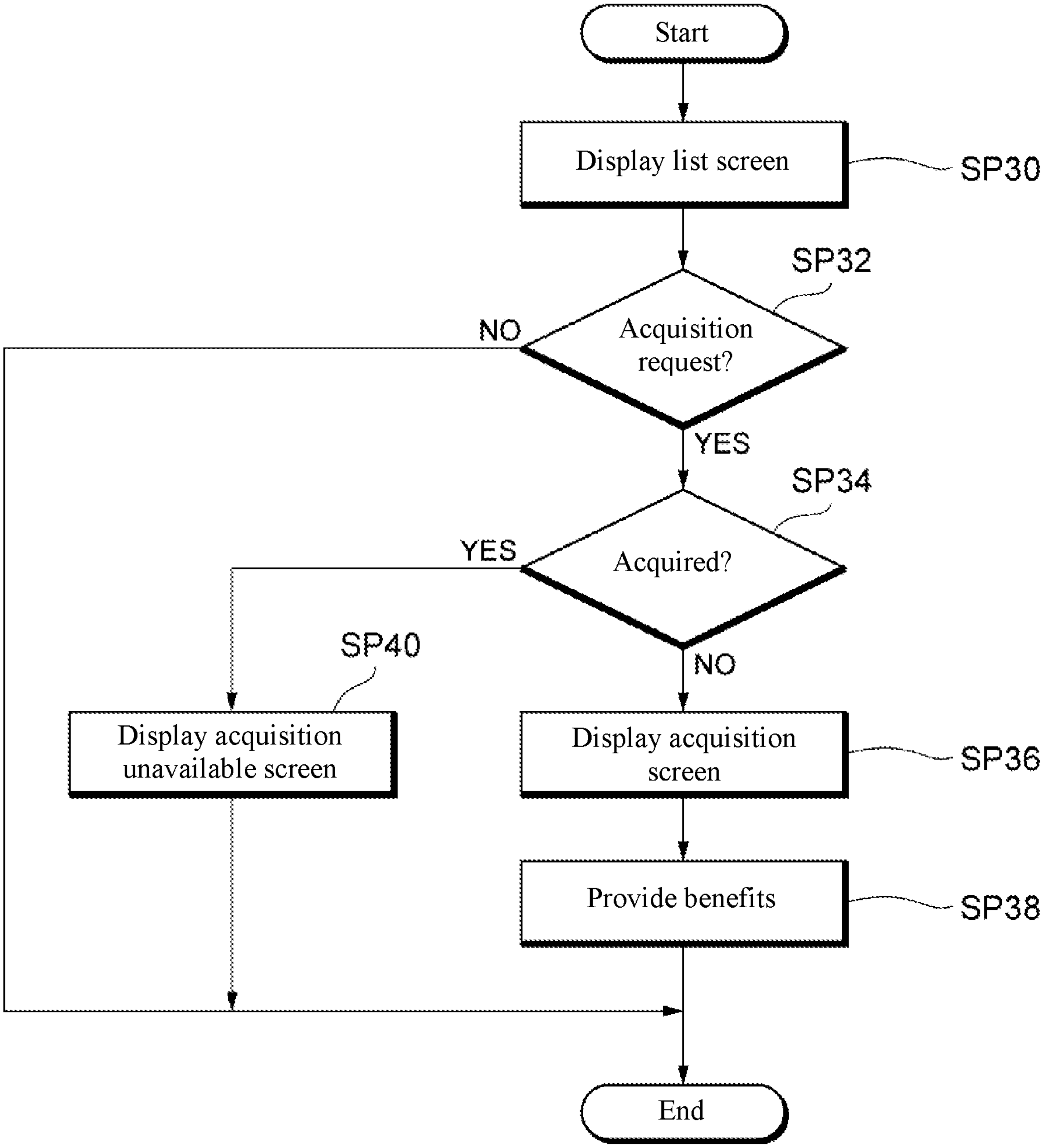
FIG. 8 is a flowchart showing an example of the flow of processing for providing benefits in the game system according to the first embodiment.

FIG. 8 is a flowchart showing an example of the flow of processing for providing benefits in the game system according to the first embodiment. Also, the processing in the following steps is started, for example, at the point when the benefit package menu is selected from the top menu, after the user has logged into the game within the benefit provision period of one benefit package.

Step SP30

The control unit 56 refers to the benefit provision information in the user information 50A, or to the benefit package information 50D, and causes the touch panel 32 of the terminal device 12 owned by the user to display a list screen of benefit packages that are within the benefit provision period.

Figure 9:
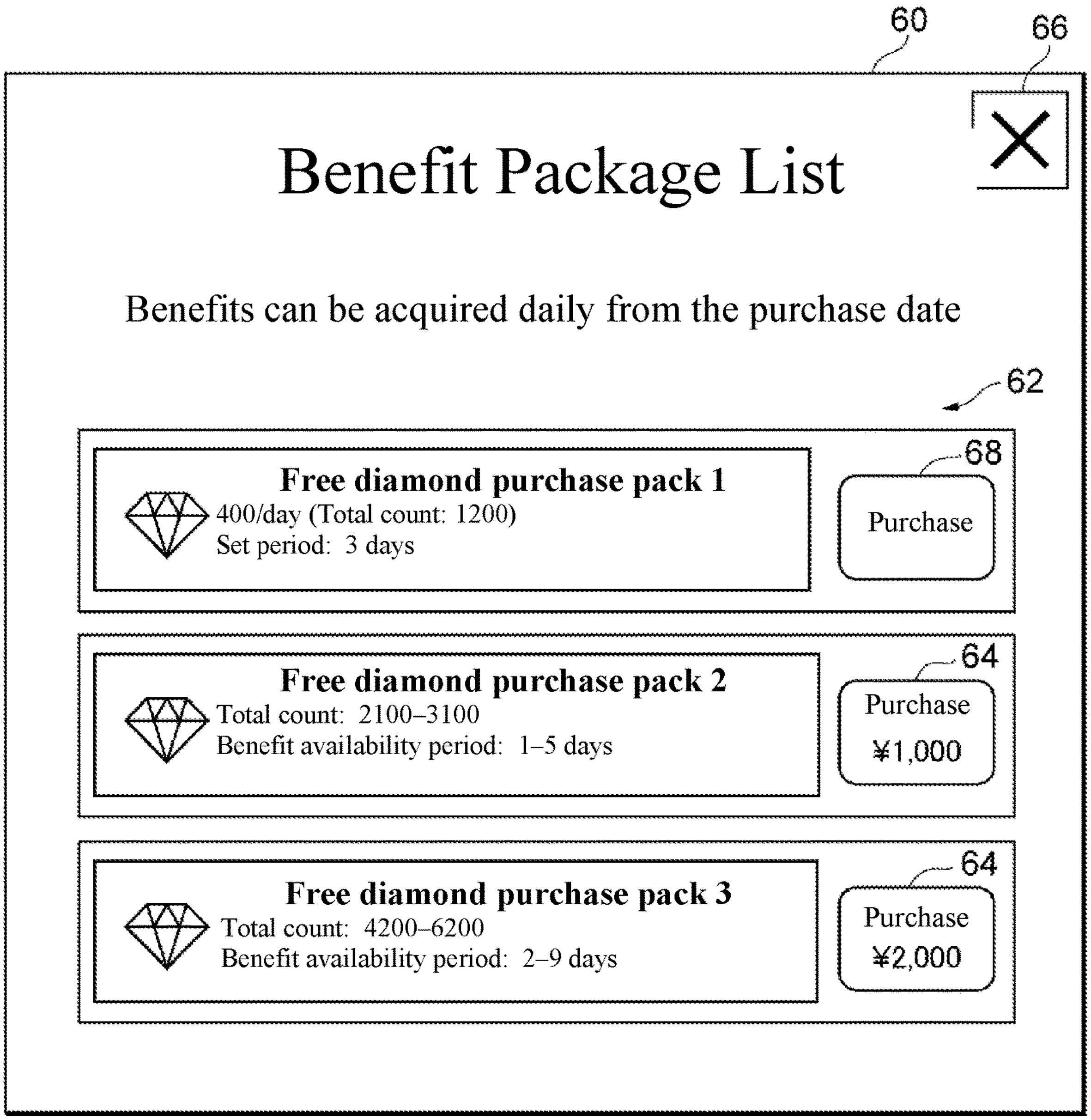
FIG. 9 is a diagram showing an example of a list screen in which one benefit package according to the first embodiment is within the benefit provision period.

FIG. 9 is a diagram showing an example of a list screen 60 in which one benefit package according to the first embodiment is within the benefit provision period.

As shown in FIG. 9, the list screen 60 is provided with a benefit package information area 62, a purchase button 64, a close button 66, and an acquisition button 68. The benefit package information area 62 shows the benefits (content) that can be acquired in one day (a specific interval period), the number of provisions, the set benefit provision period, etc., for the benefit packages purchased by the user, that is, the benefit packages whose qualification flag is 1. The acquisition button 68 is used for acquiring the benefits of the corresponding benefit package. This acquisition button 68 is displayed for a benefit package that has been purchased by the user, that is, a benefit package whose qualification flag is 1.

Going back to FIG. 8, the processing moves to the processing of step SP32.

Step SP32

The control unit 56 determines whether or not there has been a request from the user to acquire benefits corresponding to one benefit package. For example, the control unit 56 determines whether or not the acquisition button corresponding to one benefit package has been pressed by the user on the list screen. If the determination is positive, the processing then moves to the processing of step SP34. On the other hand, if the determination is negative, the processing ends the processing series shown in FIG. 8. For example, the control unit 56 makes a negative determination if the close button has been pressed on the list screen.

Step SP34

The control unit 56 refers to the benefit provision history of the benefit provision information in the user information 50A, and determines whether or not the benefit has already been acquired on the day when the user made the acquisition request (within a specific interval period). If the determination is positive, the processing then moves to the processing of step SP40. On the other hand, if the determination is negative, the processing moves to the processing of step SP36.

Step SP36

The control unit 56 displays a benefit acquisition screen on the touch panel 32 of the terminal device 12 owned by the user.

Figure 10:
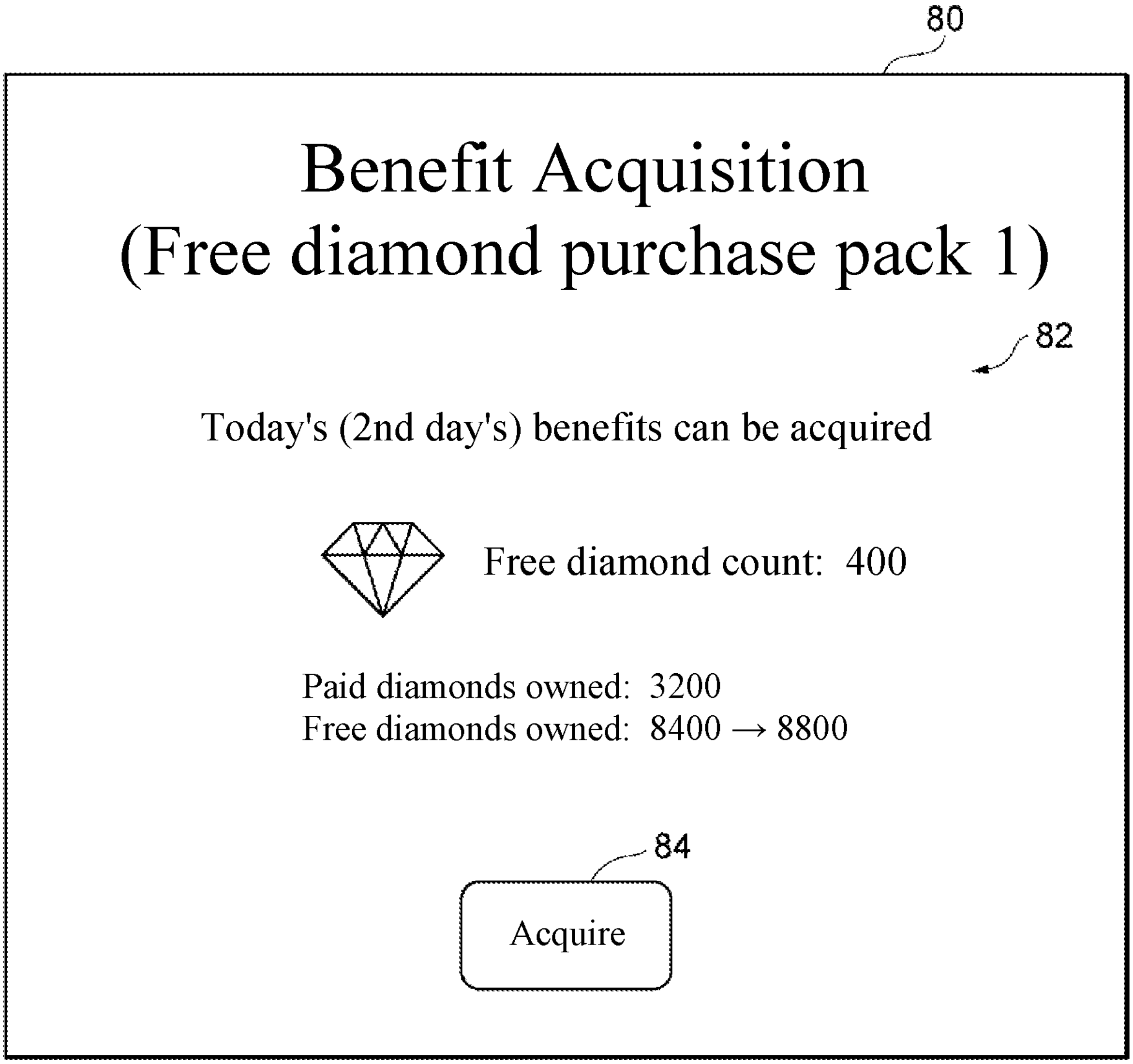
FIG. 10 is a diagram showing an example of an acquisition screen according to the first embodiment.

FIG. 10 is a diagram showing an example of an acquisition screen 80 according to the first embodiment.

As shown in FIG. 10, the acquisition screen 80 is provided with a benefit information area 82 and an acquisition button 84. The benefit information area 82 shows the benefit to be acquired by the user and its number, the number of possessed benefits, and so forth. The acquisition button 84 is used for acquiring benefits within a specific interval period (one day).

Going back to FIG. 8, the processing moves to the processing of step SP38.

Step SP38

The control unit 56 provides benefits in response to the pressing of the acquisition button on the acquisition screen by the user. For example, the control unit 56 refers to the benefit provision information in the user information 50A and acquires the benefit type (content) and the number of provisions (the number provided at each specific interval). The control unit 56 then adds the acquired number of content provisions to the possessed item information of the user information 50A.

The registration unit 54 then decreases the total number of provisions of the benefit provision information by this number of provisions, and decrements (−1) the number of times this benefit provision information is provided. The registration unit 54 then registers the date and time when the benefit was acquired (current date and time) in the benefit provision history of the benefit provision information. Then, the processing ends the processing series shown in FIG. 8.

Step SP40

The control unit 56 causes the touch panel 32 of the terminal device 12 owned by the user to display a screen indicating that no benefit can be acquired.

Figure 11:
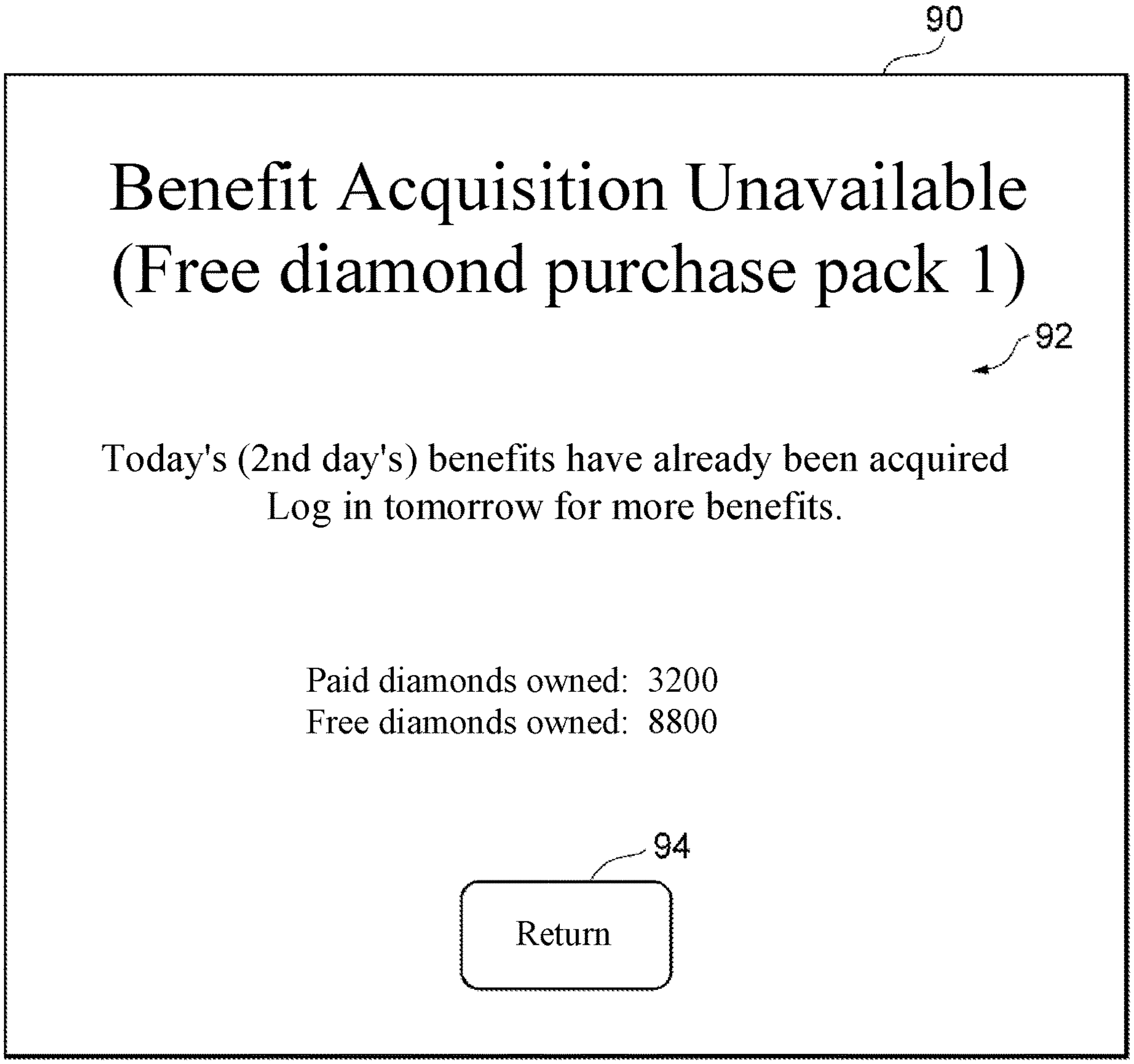
FIG. 11 is a diagram showing an example of an acquisition unavailable screen according to the first embodiment.

FIG. 11 is a diagram showing an example of an acquisition unavailable screen 90 according to the first embodiment.

As shown in FIG. 11, the acquisition unavailable screen 90 is provided with an explanatory information area 92 and a return button 94. The explanatory information area 92 shows that the user has already acquired a benefit on that day (within a specific interval period). The return button 94 is used for returning to the benefit package list screen.

Then, the processing ends the processing series shown in FIG. 8.

Technical Improvements

As described above, the first embodiment is a non-transitory computer readable recording medium storing instructions that provides a user with a benefit that can be used in a game, at specific intervals included in a benefit provision period, when the user has satisfied a specific condition, the instructions causing a computer to function as a setting unit 52 for setting a benefit provision period in response to a setting request from the user; a registration unit 54 for registering the benefit to be provided at each specific interval according to the benefit provision period; and a control unit 56 for providing the user with the registered benefit at each specific interval included in the benefit provision period.

With this configuration, the user can set the benefit provision period according to the period during which benefits can be acquired, and this motivates the user to commence the provision of benefits.

Also, in the first embodiment, the specific condition is that the user has paid a certain fee.

With this configuration, since the user can set the benefit provision period according to the period during which benefits can be acquired, this motivates the user to pay a certain fee.

Also, in the first embodiment, the specific condition is that the user carries out a mission in the game.

With this configuration, since the user can set the benefit provision period according to the period during which benefits can be acquired, this motivates the user to carry out missions in the game.

Also, in the first embodiment, the registration unit 54 makes the benefits provided at each specific interval more advantageous in inverse proportion to the length of the benefit provision period.

With this configuration, if the benefit provision period is short, advantageous benefits are provided at each specific interval, which motivates the user to commence the acquisition of benefits. Also, it is possible to reduce the sense of unfairness due to the length of the benefit provision period.

Also, in the first embodiment, the registration unit 54 increases the number of benefits provided at each specific interval in inverse proportion to the length of the benefit provision period.

With this configuration, if the benefit provision period is short, more benefits will be provided at each specific interval, which motivates the user to commence the provision of benefits.

Also, in the first embodiment, the registration unit 54 upgrades the type of benefit provided at each specific interval in inverse proportion to the length of the benefit provision period.

With this configuration, if the benefit provision period is short, the type of benefit provided at each specific interval is upgraded, which motivates the user to commence the provision of benefits.

Also, in the first embodiment, when a request to acquire a benefit has been received from the user after logging into the game, the control unit 56 provides that benefit to the user.

With this configuration, the user is motivated to log in to the game at each specific interval included in the set benefit provision period, thus making the game more interesting.

Also, in the first embodiment, the registration unit 54 increases the total number of benefits provided over the course of that benefit provision period in proportion to the length of the benefit provision period.

With this configuration, the user is further motivated to log in to the game at each specific interval included in the set benefit provision period, thus making the game more interesting.

The above embodiments provide an information processing device and a recording medium storing instructions that provide graphics improvement by displaying a benefit provision period change screen to enable a user to flexibly update a benefit provision period including a specific interval at which a benefit is provided to the user, and providing the user with the benefit depending on the updating. This improves operability of the display and gives a feeling of satisfaction to the user who acquires the benefit.

Second Embodiment

A second embodiment will now be described.

The second embodiment differs from the first embodiment in that the setting unit 52 updates the benefit provision period after the start of (during) the benefit provision period, and the registration unit 54 registers the benefit to be provided at each specific interval included in the remaining benefit provision period. Aspects of the configuration and functions of the game system according to the second embodiment that are the same as those of the game system according to the first embodiment are omitted from the description below.

In the second embodiment, the benefit package information 50D further includes an initial setting period. This initial setting period includes the initial setting of the period during which benefits are provided. The initial setting period includes, for example, the median value (such as three days) of the benefit availability period (such as one to five days).

Also, in the second embodiment, after the start of the benefit provision period, the setting unit 52 updates the benefit provision period in response to a change request from the user. For example, the setting unit 52 receives a change request from the user after the start of the benefit provision period and when the number of times the benefit provision information has been provided in the user information 50A is one or more. In other words, the setting unit 52 receives a change request from the user when the qualification flag of the benefit provision information in the user information 50A is 1.

Also, in the second embodiment, the registration unit 54 registers the benefit to be provided at each specific interval included in the remaining benefit provision period according to the benefit provision period updated by the setting unit 52. More specifically, the registration unit 54 registers the benefit type (content), the number of provisions, the total number of provisions, and the provided benefit, as the benefit to be provided at each specific interval included in the remaining benefit provision period, in the benefit provision information of the user information 50A.

Also, if the benefit provision period has been shortened by the setting unit 52, the registration unit 54 makes the benefit provided at each specific interval more advantageous. For example, the registration unit 54 increases the number of benefits provided at each specific interval, or upgrades the type of benefit provided at each specific interval in inverse proportion to the length of the benefit provision period. A specific example will now be described in which the registration unit 54 makes the benefit provided at each specific interval more advantageous.

(1) Increasing the Number of Benefits Provided at Each Specific Interval

For example, after the user has acquired the benefit (400 non-charged items) provided at a specific interval one time (the total number of provisions has decreased from 1200 to 800), if the benefit provision period has been shortened from three to two days, that is, if the benefit provision period has been shortened by one day (a specific interval period), the registration unit 54 increases the number of benefits (non-charged items) provided at each specific interval from 400 to 700.

More specifically, the registration unit 54 subtracts a specific number (such as 100) according to the numerical quantity (one) of the shortened specific interval period from the total number of provisions of the benefit provision information (such as 800) in the user information 50A. The registration unit 54 then decrements (−1) the number of times the benefit provision information is provided (such as two times). The registration unit 54 then registers (plugs in) the quotient obtained by dividing the total number of provisions (such as 700) by the number of times provided (such as one time) (total number of provisions÷number of times provided=700) as the number of provisions of this benefit provision information.

(2) Upgrading the Type of Benefit Provided at Each Specific Interval

Also, for example, after the user has acquired the benefit (10 stamina restoration items that restore 75 stamina points) provided at a specific interval one time (the total number of provisions has decreased from 30 to 20), if the benefit provision period has been shortened from three to two days, that is, if the benefit provision period has been shortened by one day (a specific interval period), the registration unit 54 upgrades the benefit provided at each specific interval (a stamina restoration item that restores 75 stamina points) by two ranks.

More specifically, the registration unit 54 subtracts a specific number (such as 10) according to the numerical quantity (one) of the shortened specific interval period from the total number of provisions (such as 20) of the benefit provision information in the user information 50A. The registration unit 54 then upgrades the benefit type (stamina restoration item that restores 75 stamina points) of the benefit provision information in the user information 50A by two ranks, and sets this as a stamina restoration item that fully restores stamina. The registration unit 54 then decrements (−1) the number of times the benefit provision information is provided (such as two times). The registration unit 54 then registers (plugs in) the quotient obtained by dividing the total number of provisions (such as 10) by the number of times provided (such as one time) (total number of provisions÷number of times provided=10) as the number of provisions of this benefit provision information.

Also, if the benefit provision period has been extended by the setting unit 52, the registration unit 54 increases the total number of benefits to be provided over the course of the remaining benefit provision period. For example, after the user has acquired the benefit (400 non-charged items) provided at a specific interval one time (the total number of provisions has decreased from 1200 to 800), if the benefit provision period has been extended from three to four days, that is, if the benefit provision period has been extended by one day (a specific interval period), the registration unit 54 increases the total number of benefits (non-charged items) provided at each specific interval from 1200 to 1300.

More specifically, the registration unit 54 adds a specific number (such as 100) according to the numerical quantity (one) of the extended specific interval period to the total number of provisions (such as 800) of the benefit information in the user information 50A. The registration unit 54 then increments (+1) the number of times (such as two times) the benefit provision information is provided. The registration unit 54 then registers (plugs in) the quotient obtained by dividing the total number of provisions (such as 900) by the number of times provided (such as three times) (total number of provisions÷number of times provided=300) as the number of provisions of this benefit provision information.

Consequently, in addition to the 400 non-charged items already acquired, the user can acquire 900 non-charged items during the remaining benefit provision period, for a total of 1300 non-charged items that can be acquired.

Flow of Processing for Updating Benefit Provision Period

Figure 12:
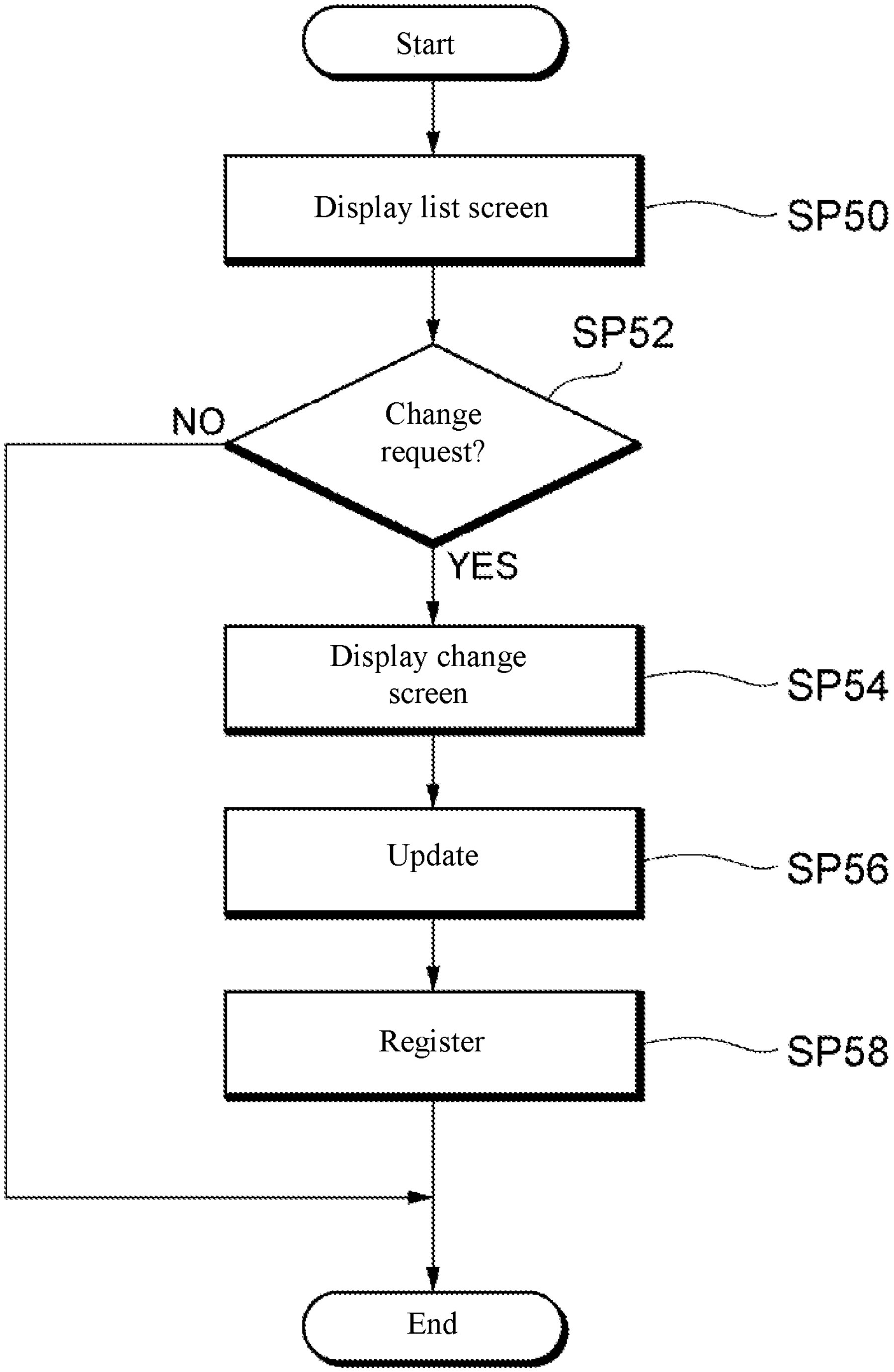
FIG. 12 is a flowchart showing an example of the flow of processing for updating the benefit provision period in the game system according to a second embodiment.

FIG. 12 is a flowchart showing an example of the flow of processing for updating the benefit provision period in the game system according to the second embodiment. Also, the processing in the following steps is started, for example, at the point when the benefit package menu is selected, after the user has logged into the game and within the benefit provision period of one benefit package. The order and details of the following steps can be changed as needed.

Step SP50

The control unit 56 refers to the benefit provision information in the user information 50A or to the benefit package information 50D, and causes the touch panel 32 of the terminal device 12 owned by the user to display a list screen of benefit packages that are within the benefit provision period.

Figure 13:
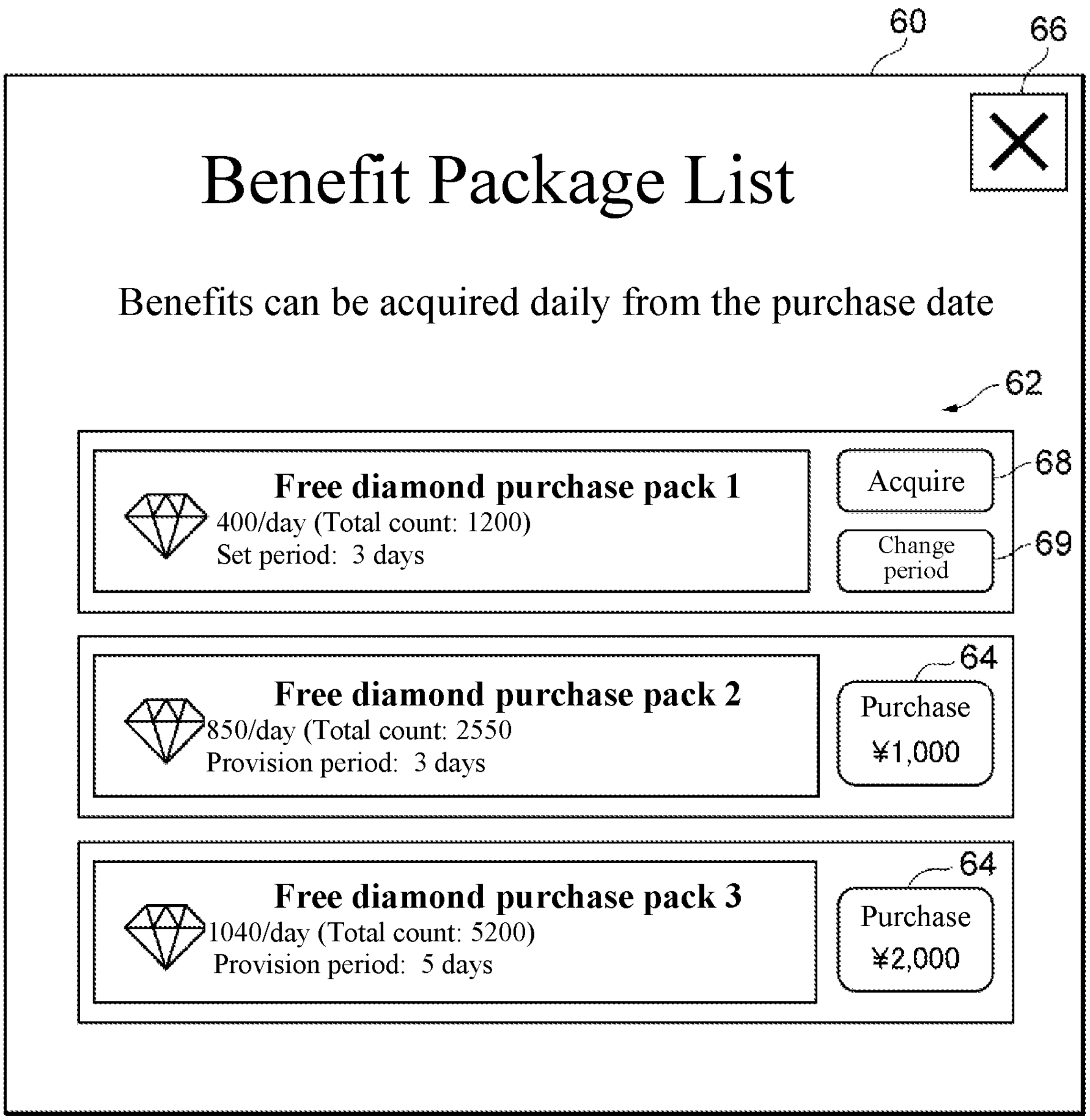
FIG. 13 is a diagram showing an example of the list screen 60 in which one benefit package according to the second embodiment is within the benefit provision period.

FIG. 13 is a diagram showing an example of a list screen 60 in which one benefit package according to the second embodiment is within the benefit provision period.

As shown in FIG. 13, the list screen 60 is provided with a benefit package information area 62, a purchase button 64, a close button 66, an acquisition button 68, and a period change button 69. The period change button 69 is used for changing the benefit provision period of the corresponding benefit package. This period change button 69 is displayed for a benefit package whose qualification flag is 1.

Going back to FIG. 12, the processing moves to the processing of step SP52.

Step SP52

The control unit 56 determines whether or not there has been a request from the user to change one benefit package. For example, the control unit 56 determines whether or not the user has pressed the period change button corresponding to one benefit package on the list screen. If the determination is positive, the processing then moves to the processing of step SP54. On the other hand, if the determination is negative, the processing ends the processing series shown in FIG. 12.

Step SP54

The control unit 56 refers to the benefit package information 50D and causes the touch panel 32 of the terminal device 12 owned by the user to display a screen for changing the benefit provision period.

Figure 14A:
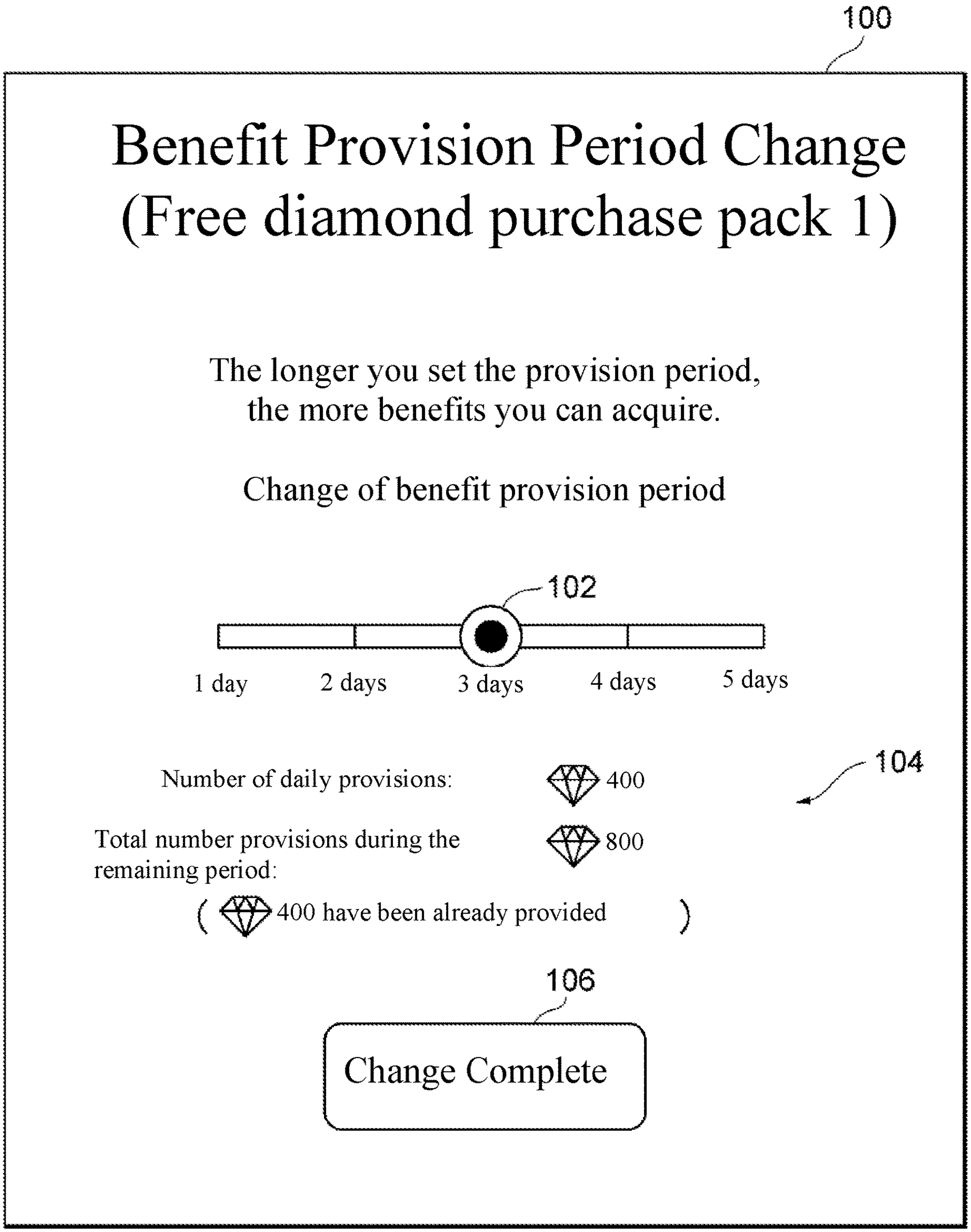
FIG. 14A is a diagram showing an example of a benefit provision period change screen according to the second embodiment, and is a diagram showing an example of the change screen before the benefit provision period has been changed by the user.
Figure 14B:
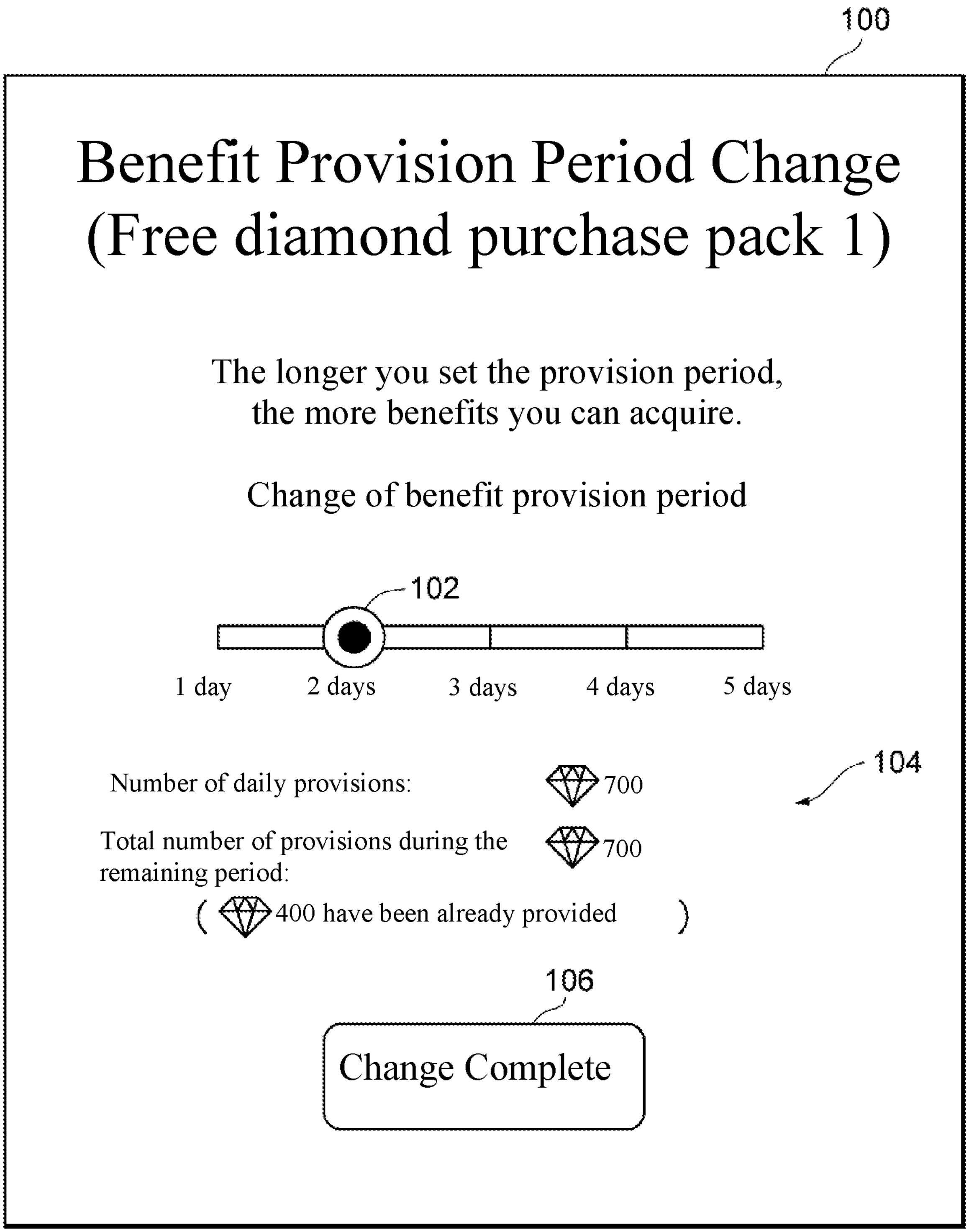
FIG. 14B is a diagram showing an example of the benefit provision period change screen according to the second embodiment, and is a diagram showing an example of the change screen when the benefit provision period has been changed to two days by the user.
Figure 14C:
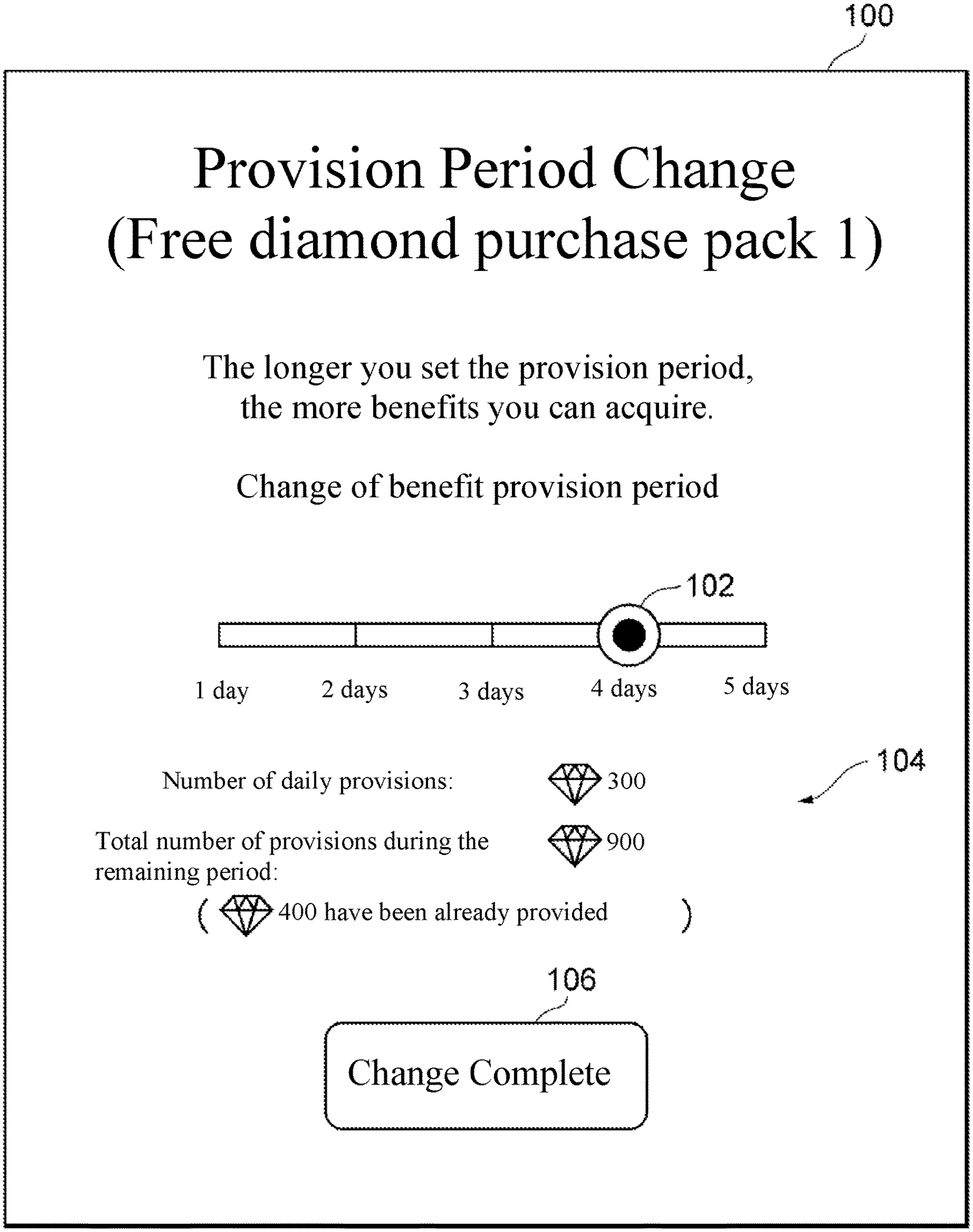
FIG. 14C is a diagram showing an example of the benefit provision period change screen according to the second embodiment, and is a diagram showing an example of the change screen when the benefit provision period has been changed to four days by the user.

FIGS. 14A-14C are diagrams showing examples of a benefit provision period change screen 100 according to the second embodiment. FIG. 14A is a diagram showing an example of the change screen 100 before the benefit provision period has been changed by the user. FIG. 14B is a diagram showing an example of the change screen 100 when the benefit provision period has been changed to two days by the user. FIG. 14C is a diagram showing an example of the change screen 100 when the benefit provision period has been changed to four days by the user.

As shown in FIGS. 14A to 14C, the change screen 100 is provided with a slide button 102, a benefit provision information area 104, and a change completion button 106. The slide button 102 is used for receiving user instructions through a movement operation made by the user.

The slide button 102 is associated with the benefit availability period of the benefit package information 50D, and is used to change the benefit provision period of the benefit package. The benefit provision information area 104 shows the benefit to be provided in one day (a specific interval period) and its number, the total number of benefits to be provided over the course of the remaining benefit provision period, the number of benefits already provided, and so forth. The change completion button 106 is used for completing a change to the benefit provision period.

Going back to FIG. 12, the processing moves to the processing of step SP56.

Step SP56

The setting unit 52 receives a press of the change completion button (change request) made by the user on the change screen. The setting unit 52 then updates the benefit provision period of the benefit provision information in the user information 50A. For example, the setting unit 52 sets (stores) the benefit provision period changed by the user as the benefit provision period of this benefit provision information. For example, if two days has been selected with the slide button on the selection screen, the setting unit 52 stores two days as the benefit provision period. Then, the processing moves to the processing of step SP58.

Step SP58

The registration unit 54 registers the benefit provided to the user according to the benefit provision period updated by the setting unit 52 in step SP56.

For example, after the user has acquired the benefit (400 non-charged items) provided at a specific interval one time (the total number of provisions has decreased from 1200 to 800), if the benefit provision period has been shortened from three days to two days, the registration unit 54 subtracts a specific number (such as 100) according to the numerical quantity (one) of the shortened specific interval period from the total number of provisions of benefit provision information (such as 800) in the user information 50A, and decrements (−1) the number of times the benefit provision information is provided (such as two times). The registration unit 54 then registers (plugs in) the quotient obtained by dividing the total number of provisions (such as 700) by the number of times provided (such as one time) (total number of provisions÷number of times provided=700) as the number of provisions of this benefit provision information.

Also, for example, after the user has acquired the benefit (400 non-charged items) provided at a specific interval one time (the total number of provisions has decreased from 1200 to 800), if the benefit provision period has been extended from three to four days, the registration unit 54 adds a specific number (such as 100) according to the numerical quantity (one) of the extended specific interval period to the total number of provisions (such as 800) of the benefit provision information in the user information 50A, and increments (+1) the number of times this benefit provision information is provided (such as two times). The registration unit 54 then registers (plugs in) the quotient obtained by dividing the total number of provisions (such as 900) by the number of times provided (such as three times) (total number of provisions÷number of times provided=300) as the number of provisions of this benefit provision information.

Then, the processing ends the processing series shown in FIG. 12.

Technical Improvements

The second embodiment above is a non-transitory computer readable recording medium storing instructions that provide a user with a benefit that can be used in a game, at specific intervals included in a benefit provision period, when the user has satisfied a specific condition, wherein the instructions cause a computer to function as a setting unit 52 for updating the benefit provision period in response to a change request from the user after the start of the provision period; a registration unit 54 for registering the benefit to be provided at each specific interval included in the remaining benefit provision period according to the updated benefit provision period; and a control unit 56 for providing the user with the registered benefit at each specific interval included in the remaining benefit provision period.

With this configuration, the benefit provision period can be changed (updated) after the start of the benefit provision period, which heightens the feeling of satisfaction felt by the user who acquires the benefit.

Also, in the second embodiment, the specific condition is that the user has paid a certain fee.

With this configuration, the user can update (change) the benefit provision period after the start of the benefit provision period, which affords the user the full benefit of having paid a certain fee.

Also, in the second embodiment, the specific condition is that the user carries out a mission within the game.

With this configuration, the user can update (change) the benefit provision period after the start of the benefit provision period, which affords the user the full benefit of having carried out the mission.

Also, in the second embodiment, if the benefit provision period has been shortened, the registration unit 54 makes the benefit provided at each specific interval more advantageous.

With this configuration, if the benefit provision period has been shortened, advantageous benefits are provided at each specific interval thereafter, which reduces the sense of unfairness due to the length of the benefit provision period.

Also, in the second embodiment, the registration unit 54 increases the number of benefits provided at each specific interval in inverse proportion to the length of the benefit provision period.

With this configuration, if the benefit provision period has been shortened, the number of benefits provided at each specific interval increase, which reduces the sense of unfairness due to the length of the benefit provision period.

Also, in the second embodiment, the registration unit 54 upgrades the type of benefit provided at each specific interval in inverse proportion to the length of the benefit provision period.

With this configuration, if the benefit provision period has been shortened, the type of benefit provided at each specific interval is upgraded, which reduces the sense of unfairness due to the length of the benefit provision period.

Also, in the second embodiment, if a request to acquire a benefit is received from the user after logging into the game, the control unit 56 provides that benefit to the user.

With this configuration, the user is motivated to log in to the game at each specific interval included in the benefit provision period, thus making the game more interesting.

Also, in the second embodiment, if the benefit provision period has been extended, the registration unit 54 increases the total number of benefits to be provided over the course of the remaining benefit provision period.

With this configuration, the user can be further motivated to log in to the game at each specific interval included in the remaining benefit provision period, thus making the game more interesting.

Modifications

The present invention is not limited to or by the above specific examples. That is, suitable design changes made to the above specific examples by a person skilled in the art are also encompassed by the scope of the present invention as long as they still have the features of the present invention. Also, the elements of the embodiments described above and the modified examples (discussed below) can be combined to an extent that this is technically possible, and these combinations are also encompassed by the scope of the present invention as long as they still have the features of the present invention.

For example, in the first embodiment, a case was described in which the setting request was made immediately after the user had paid the purchase price (a certain fee) corresponding to the benefit package, but this setting request may instead be made before paying the purchase amount.

Also, in the first embodiment, a case was described in which the setting request was made immediately after the user had carried out a mission corresponding to the benefit package, but may instead be made before the user carries out the mission.

Also, in the first and second embodiments, a case was described in which the numerical quantity (such as five) of a specific interval period included in the benefit provision period (such as five days) and the number of times provided (such as five times) were the same, but the numerical quantity of the specific interval period included in the benefit provision period may be greater than the number of times provided. For example, the setting unit 52 may set the benefit provision period of the benefit provision information to seven days (set the numerical quantity of the specific interval period to seven), and the registration unit 54 may register five as the number of times the benefit provision information is provided. Consequently, a user who has difficulty logging in at each specific interval included in the benefit provision period can be motivated to commence the provision of benefits.

Also, in the first and second embodiments, a case was described in which the benefit was content, but the benefit may instead be an effect (event) that occurs in the game. Examples of this effect may include expansion of the character ownership limit, making it possible to play special lottery games, restoration of stamina, an increase in clearance rewards in a certain period, an increase in the ability parameters of characters for a certain period, or the like. Also, this effect can be increased (upgraded) by increasing the number of character ownership expansions, increasing the number of times a special lottery game is played, changing the lottery target of a special lottery game to a high-rarity character, increasing the amount of stamina restoration, extending the increase period for clearance rewards, extending the increase period for character ability parameters, or the like.

Also, in the second embodiment, a case was described in which the benefit provision period was changed after the start (in the middle) of the benefit provision period, but limits may be imposed on the number of these changes. For example, the setting unit 52 may limit changing the benefit provision period to a single time. The setting unit 52 may increase the number of times a benefit can be changed in proportion to the length of the benefit availability period in the benefit package information 50D. For example, the setting unit 52 may increase the number of times that a benefit can be changed in proportion to the length of the maximum period of the benefit availability period.

Also, in the second embodiment, a case was described in which the setting unit 52 updated the benefit provision period in response to a change request from the user after the start of that benefit provision period, and this change (update) may be made for free or for a fee. Also, the setting unit 52 may, for example, perform the update by consuming items (such as coins) possessed by the user.

Also, in the first and second embodiments, a case was mainly described in which the content was a character or an item, but the content may instead be a weapon, armor, card, avatar, coin, point, etc.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

10 . . . server device (computer), 12 . . . terminal device, 50 . . . storage unit, 52 . . . setting unit, 54 . . . registration unit, 56 . . . control unit

What is claimed is:

1. A non-transitory computer readable recording medium storing instructions executable by an information processing device that communicates with a terminal device comprising a display via a network, the instructions causing the information processing device to execute:

causing the terminal device to execute a game in which a user obtains, during a benefit provision period, a benefit that can be used in the game;

causing the terminal device to display, on the display, a benefit provision period change screen that receives a change request to change the benefit provision period from the user;

in response to receiving the change request from the terminal device, updating the benefit provision period after a start of the benefit provision period during a time when the terminal device executes the game;

registering the benefit that is provided at a specific interval included in a remaining benefit provision period depending on the updated benefit provision period;

causing the terminal device to modify the benefit provision period change screen to reflect the registered benefit and the updated benefit provision period in real time; and in response to a specific condition being satisfied, transmitting the registered benefit to the terminal device and reflecting the registered benefit in the game at the specific interval included in the remaining benefit provision period.

2. The non-transitory computer readable recording medium according to claim 1, wherein the specific condition is that the user has paid a certain fee.

3. The non-transitory computer readable recording medium according to claim 1, wherein the specific condition is that the user carries out a mission within the game.

4. The non-transitory computer readable recording medium according to claim 1, wherein as the benefit provision period has been shortened, the benefit provided at the specific interval is made more advantageous.

5. The non-transitory computer readable recording medium according to claim 4, wherein a number of benefits provided at the specific interval is increased in inverse proportion to a length of the benefit provision period.

6. The non-transitory computer readable recording medium according to claim 4, wherein a type of benefit provided at the specific interval is upgraded in inverse proportion to a length of the benefit provision period.

7. The non-transitory computer readable recording medium according to claim 1, wherein the benefit is provided to the user in response to a request to acquire the benefit has been received from the user after login to the game.

8. The non-transitory computer readable recording medium according to claim 7, wherein once the benefit provision period has been extended, a total number of benefits to be provided in the remaining benefit provision period is increased.

9. An information processing device that communicates with a terminal device comprising a display via a network, the information processing device comprising:

a control device that:

causes the terminal device to execute a game in which a user obtains, during a benefit provision period, a benefit that can be used in the game;

causes the terminal device to display, on the display, a benefit provision period change screen that receives a change request to change the benefit provision period from the user;

in response to receiving the change request from the terminal device, updates the benefit provision period after a start of the benefit provision period during a time when the terminal device executes the game;

registers the benefit that is provided at a specific interval included in a remaining benefit provision period depending on the updated benefit provision period;

causes the terminal device to modify the benefit provision period change screen to reflect the registered benefit and the updated benefit provision period in real time; and in response to a specific condition being satisfied, transmitting the registered benefit to the terminal device and reflecting the registered benefit in the game at the specific interval included in the remaining benefit provision period.

10. The non-transitory computer readable recording medium according to claim 1, wherein the benefit provision period change screen indicates, for the updated benefit provision period, at least one of:

a number of benefits provided at the specific interval, wherein the number is increased as the updated benefit provision period is short, and a total number of benefits provided over a course of the remaining benefit provision period, wherein the total number is increased as the updated benefit provision period is long.

11. The non-transitory computer readable recording medium according to claim 1, wherein the benefit provision period change screen indicates:

a message that a total number of benefits provided over a course of the remaining benefit provision period is increased as the updated benefit provision period is long, and a button that corresponds to the benefit provision period and receives the change request.

* * * * *